(12) United States Patent
Minegishi et al.

(10) Patent No.: US 6,440,030 B1
(45) Date of Patent: Aug. 27, 2002

(54) DRIVING APPARATUS

(75) Inventors: Kiyoji Minegishi, Chita-gun; Jun Tamenaga; Akira Yamamoto, both of Ohbu, all of (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/526,284

(22) Filed: Mar. 15, 2000

(30) Foreign Application Priority Data

| Mar. 16, 1999 | (JP) | 11-070399 |
| Jun. 25, 1999 | (JP) | 11-180641 |
| Sep. 29, 1999 | (JP) | 11-275815 |
| Jan. 6, 2000 | (JP) | 2000-000835 |

(51) Int. Cl.[7] .............. F16H 1/32; F16H 37/02
(52) U.S. Cl. .............. 475/178; 475/183; 475/337
(58) Field of Search .............. 475/178, 183, 475/337, 149

(56) References Cited

U.S. PATENT DOCUMENTS 1,871,835 A * 8/1932 Batchelder .............. 475/183

5,651,747 A * 7/1997 Minegishi et al. .............. 475/178 X

FOREIGN PATENT DOCUMENTS

JP  10-299841 A  * 11/1998

* cited by examiner

*Primary Examiner*—Charles A Marmor
*Assistant Examiner*—Ankur Parekh
(74) *Attorney, Agent, or Firm*—Arent Fox Kintner Plotkin & Kahn, PLLC

(57) ABSTRACT

A geared motor 101 comprising a reduction gear unit 102 of oscillating internal meshing planetary gear structure type and a motor unit 103 coupled to each other, the reduction gear unit 102 having a first shaft 111 and a second shaft 112 located on its center axis L, external gears 115$a$ and 115$b$ being fitted on the outer periphery of the first shaft so as to be capable of oscillating rotations, an internal gear 120 with which the external gears mesh internally being provided concentrically with the first shaft, the second shaft being coupled to the external gears via means 117 for extracting the rotational components of the external gears. A simple planetary roller mechanism 202 for transmitting rotational power by means of the friction between rollers is interposed between the reduction gear unit and the motor unit to reduce the vibration and noise levels greatly.

12 Claims, 26 Drawing Sheets

FIG.9

| | SECOND-STAGE REDUCTION UNIT | FIRST-STAGE REDUCTION UNIT | | | |
|---|---|---|---|---|---|
| (a) | C1 + | C2 | + M | ··· FIG.25 | (COMPARATIVE EXAMPLE) |
| (b) | C1 + | F(G) | + M | ··· FIG.26 | (COMPARATIVE EXAMPLE) |
| (c) | C1 + | F(T/D) | + M | ··· FIG.23 | (COMPARATIVE EXAMPLE) |
| (d) | C1 + | P(G) | + M | ··· FIG.27 | (COMPARATIVE EXAMPLE) |
| (e) | C1 + | P(T/D)A | + M | ··· FIG.1 | (THE PRESENT INVENTION) |
| (f) | C1 + | P(T/D)B | + M | ··· FIG.6 | (THE PRESENT INVENTION) |

M ··· MOTOR
C ··· OSCILLATING INTERNAL MESHING PLANETARY GEAR TYPE
F ··· POWER-DISTRIBUTED SHAFT TYPE
P ··· SIMPLE PLANETARY TYPE
G ··· GEAR TYPE
T/D ··· FRICTIONAL TRANSMISSION TYPE BY MEANS OF ROLLERS
C1 ··· REDUCTION STAGE OF OSCILLATING INTERNAL MESHING PLANETARY GEAR TYPE (AT THE SUBSEQUENT STAGE)
C2 ··· REDUCTION STAGE OF OSCILLATING INTERNAL MESHING PLANETARY GEAR TYPE (AT THE PRECEDING STAGE)
F(G) ··· REDUCTION STAGE OF POWER-DISTRIBUTED SHAFT TYPE (GEAR SYSTEM)
F(T/D) ··· REDUCTION STAGE OF POWER-DISTRIBUTED SHAFT TYPE (ROLLER SYSTEM)
P(G) ··· REDUCTION STAGE OF PLANETARY TYPE (GEAR SYSTEM)
P(T/D) ··· REDUCTION STAGE OF PLANETARY TYPE (ROLLER SYSTEM)
A ··· TYPE TO RETAIN ROLLERS BY RETAINER
B ··· TYPE TO RETAIN ROLLERS BY PINS

FIG.10

NL: 0%LOAD
FL:100%LOAD

| MODEL | MOTOR CAPACITY kW | REDUCTION RATIO | MOUNTING MODE | NOISE LEVEL dB(A) | |
|---|---|---|---|---|---|
| | | | | NL | FL |
| (a) C1+C2 +M | 0.2 | 143 | LIGHTWEIGHT BASE | 54.1 | 59.8 |
| | | | FC SURFACE PLATE | 50.0 | 52.8 |
| (b) C1+F(G) +M | 0.2 | 181 | LIGHTWEIGHT BASE | 56.1 | 63.7 |
| | | | FC SURFACE PLATE | — | — |
| (c) C1+F(T/D) +M | 0.2 | 124 | LIGHTWEIGHT BASE | 52.4 | 59.2 |
| | | | FC SURFACE PLATE | — | — |
| (d) C1+P(G) +M | 0.2 | 131 | LIGHTWEIGHT BASE | 54.9 | 70.8 |
| | | | FC SURFACE PLATE | — | — |
| (e) C1+P(T/D)A+M | 0.2 | 175 | LIGHTWEIGHT BASE | 47.5 | 47.4 |
| | | | FC SURFACE PLATE | 43.8 | 44.7 |
| (f) C1+P(T/D)B+M | 0.2 | 175 | LIGHTWEIGHT BASE | 44.9 | 45.8 |
| | | | FC SURFACE PLATE | 43.7 | 44.1 |
| MOTOR ONLY | 0.2 | — | FC SURFACE PLATE | 42.0 | — |

FIG.12
"0% LOAD + LIGHTWEIGHT BASE"
(a) C1+C2+M
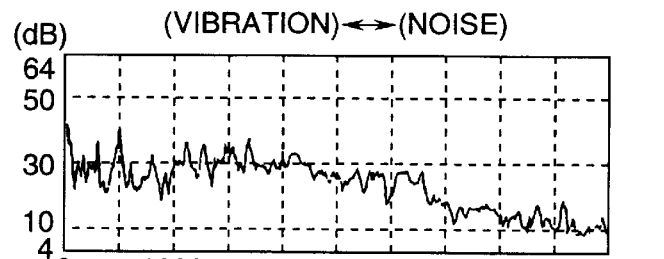
(b) C1+F(G)+M
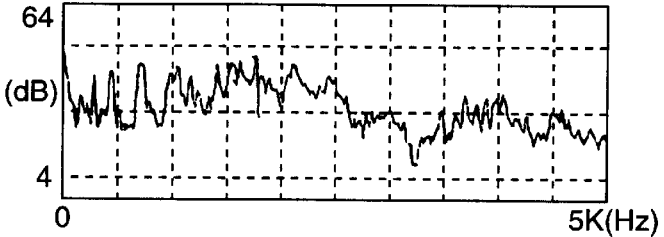
(c) C1+F(T/D)+M
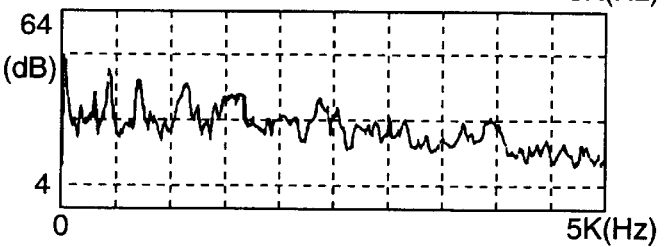
} COMPARATIVE EXAMPLE
(d) C1+P(G)+M
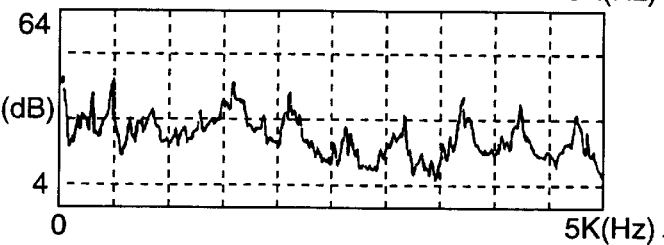
(e) C1+P(T/D)A+M
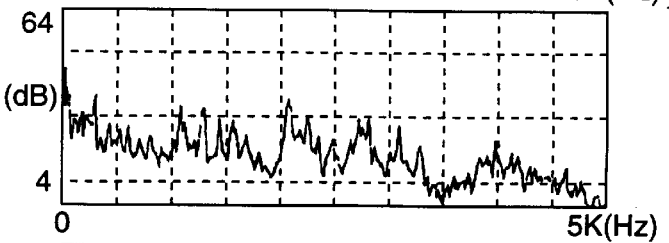
(f) C1+P(T/D)B+M
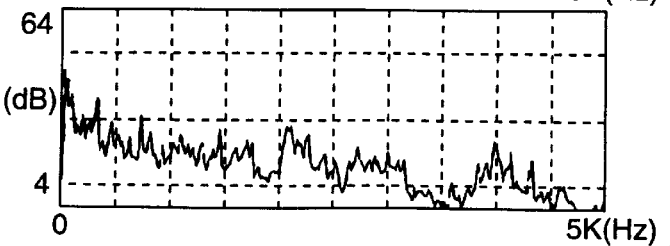
} THE PRESENT INVENTION

FIG.13
"0% LOAD + FC SURFACE PLATE"
(a) C1+C2+M
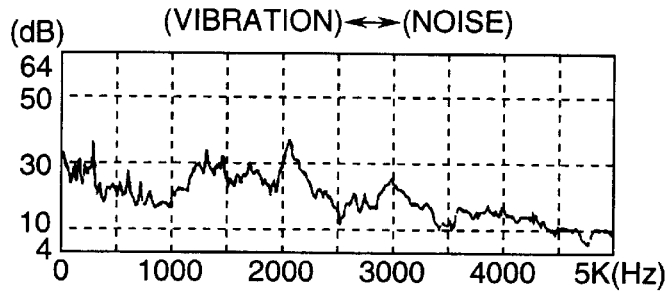
(b) C1+F(G)+M
NO CHART
(c) C1+F(T/D)+M
NO CHART
(d) C1+P(G)+M
NO CHART
⎫
⎬ COMPARATIVE EXAMPLE
⎭
(e) C1+P(T/D)A+M
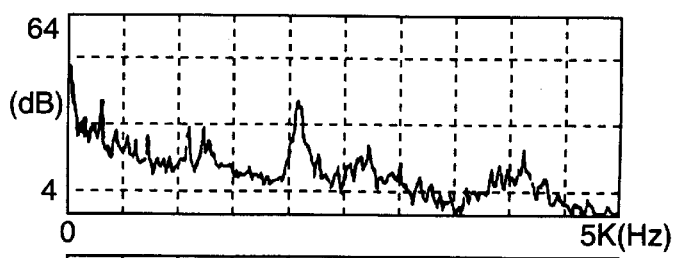
(f) C1+P(T/D)B+M
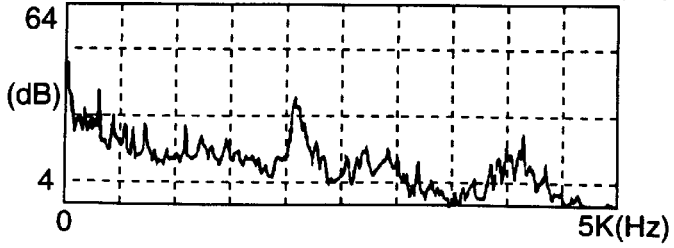
⎫
⎬ THE PRESENT INVENTION
⎭

FIG.14
"100% LOAD + LIGHTWEIGHT BASE"
(VIBRATION) ↔ (NOISE)
(a) C1+C2+M
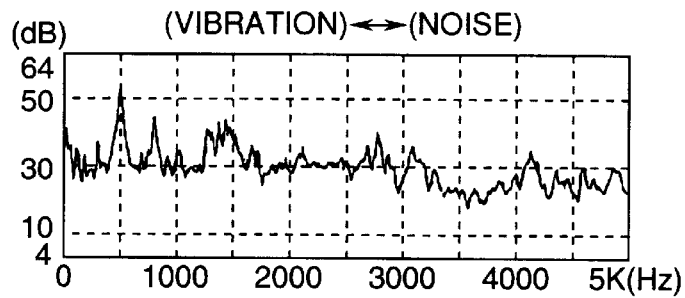
(b) C1+F(G)+M
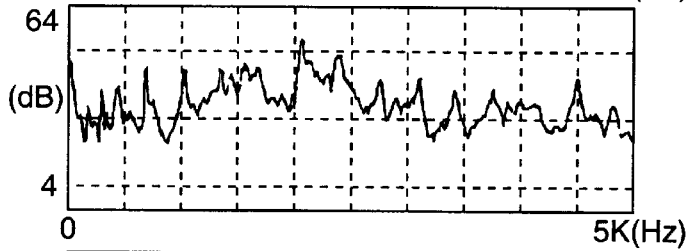
(c) C1+F(T/D)+M
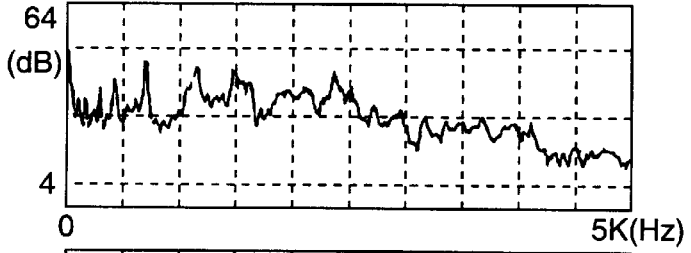
COMPARATIVE EXAMPLE
(d) C1+P(G)+M
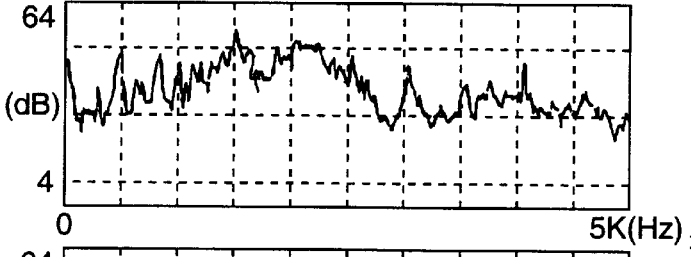
(e) C1+P(T/D)A+M
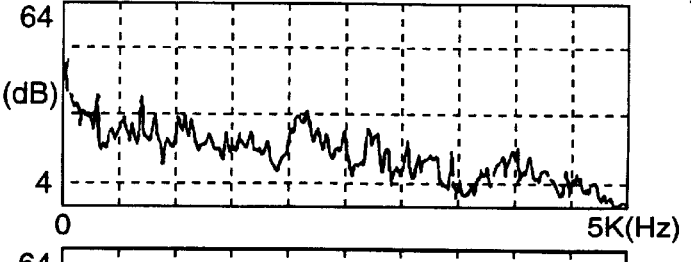
(f) C1+P(T/D)B+M
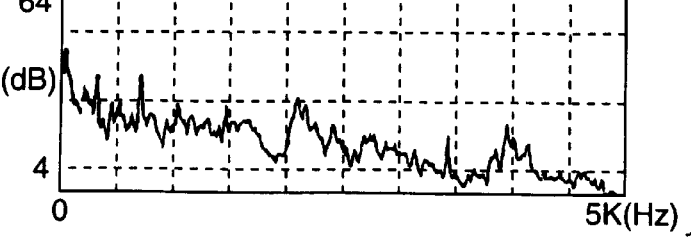
THE PRESENT INVENTION

FIG.15
"100% LOAD + FC SURFACE PLATE"
(a) C1+C2+M
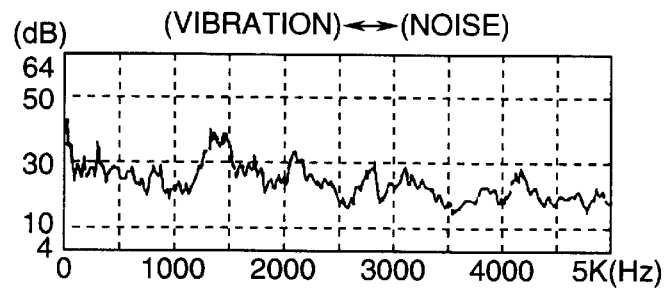
COMPARATIVE EXAMPLE
(b) C1+F(G)+M
NO CHART
(c) C1+F(T/D)+M
NO CHART
(d) C1+P(G)+M
NO CHART
(e) C1+P(T/D)A+M
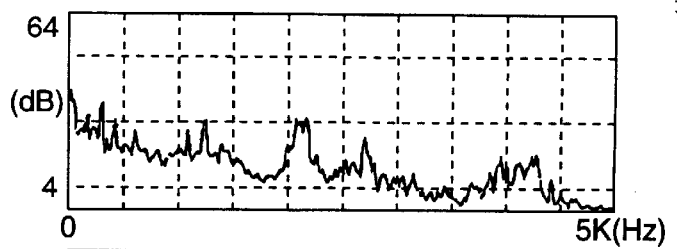
THE PRESENT INVENTION
(f) C1+P(T/D)B+M
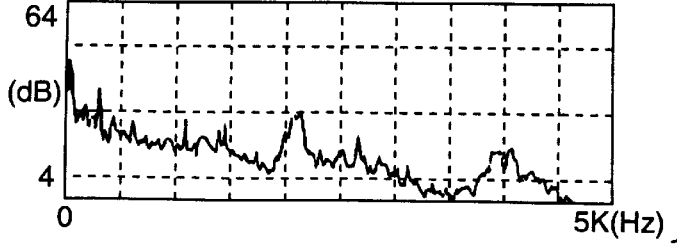

FIG.16

| | | | | |
|---|---|---|---|---|
| SUN ROLLER INPUT | A | FIXED<br>RING ROLLER | OUTPUT<br>PLANETARY CARRIER (PLANETARY ROLLERS) | INPUT<br>SUN ROLLER |
| | B | OUTPUT<br>RING ROLLER | FIXED<br>PLANETARY CARRIER (PLANETARY ROLLERS) | INPUT<br>SUN ROLLER |
| PLANETARY CARRIER INPUT | C | FIXED<br>RING ROLLER | INPUT<br>PLANETARY CARRIER (PLANETARY ROLLERS) | OUTPUT<br>SUN ROLLER |
| | D | OUTPUT<br>RING ROLLER | INPUT<br>PLANETARY CARRIER (PLANETARY ROLLERS) | FIXED<br>SUN ROLLER |
| RING ROLLER INPUT | E | INPUT<br>RING ROLLER | FIXED<br>PLANETARY CARRIER (PLANETARY ROLLERS) | OUTPUT<br>SUN ROLLER |
| | F | INPUT<br>RING ROLLER | OUTPUT<br>PLANETARY CARRIER (PLANETARY ROLLERS) | FIXED<br>SUN ROLLER |

COMPARATIVE EXAMPLE

COMPARATIVE EXAMPLE

FIG.27 COMPARATIVE EXAMPLE

DRIVING APPARATUS

BACKGROUND OF THE INVENTION

1. Field of the Invention

The present invention particularly relates to a driving apparatus having an oscillating internal meshing planetary gear structure as its speed change mechanism, such as a geared motor.

2. Description of the Related Art

Conventionally, oscillating internal meshing planetary gearing is widely known which has an internal gear and an external gear internal meshing with the internal gear, the center axis of the internal gear lying inside the periphery of the external gear [the gearing corresponding to International Patents Classification (IPC) F16H 1/32].

FIG. 22 shows an example of a geared motor that has conventional oscillating internal meshing planetary gearing of this type as its reduction gear unit, which is described in Japanese Patent Laid-Open Publication No.Hei 5-231482. This geared motor 1 includes the above-mentioned reduction gear unit (oscillating internal meshing planetary gear unit) 2 and a motor unit 3 connected and integrated with each other.

The reduction gear unit 2 has a casing 51 which is composed of a central casing 52 disposed at the axial center, a joint casing 53 on the side closer to the motor unit 3, and a front casing 54 on the side opposite from the motor unit 3. The motor unit 3 has a casing 55 which is composed of a cylindrical casing 56 having a stator and the like arranged inside, the joint casing 53 on the side closer to the reduction gear unit 2, and a rear cover 57 on the side opposite from the reduction gear unit 2. Here, the above-mentioned joint casing 53 comprises both parts of the casings 51 and 55 for the units 2 and 3. Accordingly, the units 2 and 3 are integrally connected with each other through the joint casing 53.

The reduction gear unit 2 has first and second shafts 11 and 12 serving as input and output shafts, respectively. Both the shafts are aligned on the center axis L of the unit. The first shaft 11 is disposed on one axial end of the reduction gear unit 2. The second shaft 12 is on the other axial end of the reduction gear unit 2.

Two eccentric bodies 13a and 13b are fitted on the outer periphery of the first shaft 11 so as to axially adjoin each other with a given phase difference therebetween (180°, in this example). These eccentric bodies 13a and 13b make rotations together with the first shaft 11. The respective centers of the eccentric bodies 13a and 13b are a given eccentricity off the axis of the first shaft 11. External gears 15a and 15b are fitted onto the outer peripheries of the eccentric bodies 13a and 13b via bearings 14a and 14b, respectively.

The plural rows of external gears 15a and 15b fitted on the eccentric bodies 13a and 13b are provided with a plurality of inner pin holes 16a and 16b, respectively. Inner pins 17 are fitted to the inner pin holes 16a and 16b with some play.

The external gears are provided in two (in plural rows) mainly for the sake of enhancing the transmission capacity, maintaining the strength, and keeping the rotational balance.

On the outer peripheries of the external gears 15a and 15b are provided outward teeth each having a trochoidal tooth profile or a circular arc tooth profile. These outward teeth come into internal mesh with an internal gear 20 that is provided concentrically with the first shaft 11. The internal gear 20 is integrally formed on the inner periphery of the central casing 52. Each inward tooth of the internal gear 20 is formed with an outer pin 21 held on the inner periphery of the central casing 52.

The result is that the reduction gear unit 2 is characterized by having the internal gear 20 and the external gears 15a, 15b internally meshing with the internal gear 20, the center of the internal gear 20 lying inside the peripheries of the external gears 15a, 15b (the characteristic prescribed in IPC F16H 1/32).

The two external gears 15a and 15b are interposed between a pair of support carriers 23 and 24. These carriers 23 and 24 are rotatably supported by bearings 31 and 32 fitted to the inner peripheries of the joint and front casings 53 and 54, respectively. The carriers 23 and 24 are also integrally connected with each other by a plurality of carrier pins (coupling pins) 25 and spacers 26 piercing through the external gears 15a and 15b.

The inner pins 17, fitted to the inner pin holes 16a and 16b in the above-mentioned external gears 15a and 15b with some play, are connected at both ends with the carriers 23 and 24 on both sides so as to be capable of sliding rotations. This allows only the rotational components of the external gears 15a and 15b to be transmitted through the inner pins 17 to the carriers 23 and 24 on both the sides.

The carrier 23 closer to the motor unit 3 is of annular shape having a center hole 23a. One end of the first shaft 11 lies inside the center hole 23a so that the end can be coupled to a motor shaft 61.

The other carrier 24 is integrally formed on the base of the second shaft 12, and has a recess 24a into which the other end of the first shaft 11 is inserted. A bearing 33 is fitted to the inner periphery of the central hole 23a in the carrier 23, and a bearing 34 is fitted to the inner periphery of the other carrier 24. The first shaft 11 is rotatably supported by the bearings 33 and 34.

The motor shaft 61 of the motor unit 3 is supported at its rear end by a bearing 62 and at its front end by a bearing 63. The bearings 62 and 63 are fitted to the rear cover 57 and the joint casing 53, respectively. Here, the motor shaft 61 is aligned to be coaxial with the center axis L of the reduction gear unit 2.

The extremity of the motor shaft 61, projected outward from the front-side bearing 63, is inserted into the reduction gear unit 2. Within the center hole 23a in the carrier 23 of the reduction gear unit 2, the extremity is coupled to the end of the first shaft 11 mentioned above via a coupling 70.

In this case, splines are formed in the inner periphery of the coupling 70 and the outer peripheries of both shafts 11 and 61 so that the shafts 11 and 61 come into spline connection with each other through the coupling 70. Here, the splines establish the floating connection between the first shaft 11 and the motor shaft 61 while allowing relative radial play therebetween.

Now, description will be given of the operation of this geared motor.

In the geared motor 1 of such constitution, one rotation of the first shaft 11 coupled to the motor shaft 61 makes one rotation of the eccentric bodies 13a and 13b. This one rotation of the eccentric bodies 13a and 13b urges the external gears 15a and 15b to oscillate and rotate about the first shaft 11. However, since their free rotations on the axis are restricted by the internal gear 20, the external gears 15a and 15b almost exclusively make oscillations while internal meshing with this internal gear 20 (this is a characteristic of speed reduction structures of this type).

Now, assuming that the number of teeth on the respective external gears 15a, 15b is N and the number of teeth on the internal gear 20 is N+1, the difference between the numbers of teeth is "1." On that account, each rotation of the input shaft 1 shifts (rotates) the external gears 15a and 15b by the amount corresponding to one tooth with respect to the fixed internal gear 20. This means that one rotation of the first shaft 11 is reduced to $-1/N$ rotations of the external gears 15a and 15b.

The oscillating components in the rotations of the external gears 15a and 15b are absorbed by the clearances between the inner pin holes 16a, 16b and the inner pins 17. Thus, only the rotational components are transmitted via the inner pins 17 to the carriers 23 and 24, and then to the second shaft 12.

This consequently achieves speed reduction of $-1/N$ in reduction ratio (here, the negative sign represents a reverse rotation).

Next, description will be directed to another conventional example.

FIGS. 23 and 24 show an example of a conventional geared motor described in Japanese Patent Laid-Open Publication No.Hei 10-299841. This geared motor 500 uses an oscillating internal meshing planetary gear structure of so-called power-distributed shaft type. This internal meshing planetary gear structure comprises a first shaft 502, power-distributed shafts 503, eccentric bodies 504, external gears 505, an internal gear 506, and a second shaft 507. The first shaft 502 is to be coupled to an external motor shaft 501. The plurality of power-distributed shafts 503 are arranged on the circumference of a circle concentric with the first shaft 502, and make revolutions in response to the first shaft 502. The eccentric bodies 504 are arranged on the plurality of power-distributed shafts 503 on a one-on-one basis. The external gears 505 are fitted on the eccentric bodies 504 so as to be capable of eccentric rotations with respect to the first axis 502. The internal gear 506 is arranged to be concentric with the first axis 502. The above-described external gears 505 come into internal mesh with the internal gear 506 while making the eccentric rotations with respect to the first shaft 502. The second shaft 507 is coupled with the plurality of power-distributed shafts 503. In this internal meshing planetary gear structure, the eccentric bodies 504 are interposed between a pair of support carriers 523 and 524, and the power-distributed shafts 503 are rotatably supported by the carriers 523 and 524. In addition, the above-mentioned first shaft 502 is provided with a sun roller 511. A plurality of power-distributed rollers 512 for making external contact with the sun roller 511 are put into spline connection with the plurality of power-distributed shafts 503 on a one-on-one basis. Around these plurality of power-distributed rollers 512 is arranged a press-contact ring 513 which has an inner diameter somewhat smaller than the sum of the diameter of the above-mentioned sun roller 511 and the value twice the diameter of the power-distributed rollers 512. The power-distributed rollers 512 make internal contact with the press-contact ring 513. Here, the press-contact ring 513 has the function of creating contact forces between the sun roller 511 and the power-distributed rollers 512, which is different from that of the ring in a simple planetary structure.

This kind of gear structures as shown in FIGS. 22 and 23 are divided into two types: namely, a type in which external gears make oscillating rotations with respect to internal gears as described above, and the contrasting type in which internal gears make oscillating rotations with respect to external gears.

By the way, with the recent development of industries, the increasing variety of user needs has grown the demand for driving apparatuses which can offer yet higher reduction ratios (for example, reduction ratios equal to or higher than 1/200) with compact configurations. FIG. 28 shows a driving apparatus of two stage type, having been proposed in response to these needs.

This driving apparatus 1001 has an additional reduction mechanism unit interposed between its reduction mechanism unit and drive unit to make higher reduction ratios up to about 1/1000 attainable. Specifically, the driving apparatus 1001 comprises: a drive unit (motor) 1002 for generating rotational power; a first reduction mechanism unit 1004 coupled to the drive unit for rotational power transmission; and a second reduction mechanism unit 1006 of internal meshing planetary gear structure, coupled to the first reduction mechanism unit for rotational power transmission.

The second reduction mechanism unit 1006 in the driving apparatus 1001 has a first shaft (input shaft) 1011 to be coupled to the first reduction mechanism unit 1004, and a second shaft 1012 arranged to be coaxial with the first shaft 1011 to make the output shaft. Two eccentric bodies 1013a and 1013b are fitted on the outer periphery of the first shaft 1011 so as to axially adjoin each other with a given phase difference therebetween (180°, in this example) These eccentric bodies 1013a and 1013b make rotations together with the first shaft 1011. The respective centers of the eccentric bodies 1013a and 1013b are a given eccentricity off the axis of the first shaft 1011. External gears 1015a and 1015b are fitted on the outer peripheries of the eccentric bodies 1013a and 1013b via bearings 1014a and 1014b, respectively.

The plurality of external gears 1015a and 1015b fitted on the eccentric bodies 1013a and 1013b are provided with a plurality of inner pin holes 1016a and 1016b, respectively. Inner pins 1017 are fitted to inner pin holes 1016a and 1016b with some play.

The external gears are provided in two (in plural rows) mainly for the sake of enhancing the transmission capacity, maintaining the strength, and keeping the rotational balance. The plural-row configuration is particularly preferable when this structure is applied to the subsequent stage of a two-stage type driving apparatus as in this example. The reason for this is that the transmission capacity (transmission torque) increases on the subsequent stage.

On the outer peripheries of the external gears 1015a and 1015b are provided outward teeth each having a trochoidal tooth profile or a circular arc tooth profile. These outward teeth come into internal mesh with an internal gear 1020 which is provided concentrically with the first shaft 1011. The internal gear 1020 is integrally formed on the inner periphery of the casing 1051. Each inward tooth of the internal gear 1020 is formed with an outer pin 1021.

The result is that the second reduction mechanism unit 1006 is characterized by having the internal gear 1020 and the external gears 1015a, 1015b internally meshing with the internal gear 1020, the center of the internal gear 1020 lying inside the peripheries of the external gears 1015a, 1015b (the characteristic prescribed in IPC F16H 1/32).

The casing 1051, explained particularly, is composed of a central casing 1052, a joint casing 1053 on the side close to the drive unit 1002, and a front casing 1054 arranged on the side opposite from the joint casing 1053. Thus, this casing 1051 accommodates the second reduction mechanism unit 1006.

The two external gears 1015a and 1015b are interposed between a pair of carriers (supporting carriers) 1023 and 1024. These carriers 1023 and 1024 are rotatably supported by two bearings 1031 and 1032 fitted to the inner periphery of the casing 1051. Besides, the carriers 1023 and 1024 are integrally connected with each other by a plurality of carrier pins (coupling pins) 1025 and spacers 1026 piercing through the external gears 1015a and 1015b.

The inner pins 1017, fitted to the inner pin holes 1016a and 1016b in the external gears 1015a and 1015b with some play, are supported at both sides by the pair of carriers 1023 and 1024 so as to be capable of sliding rotations. This allows only the rotational components of the external gears 1015a and 1015b to be transmitted to the carriers 1023 and 1024.

The carrier 1023 closer to the drive unit 1002 is of annular shape having a center hole 1023a. One end of the first shaft is supported by the center hole 1023a via a bearing. The other shaft end is supported by another bearing fitted into the carrier 1024 on the opposite side. In short, the first shaft 1011 is rotatably accommodated in between the pair of carriers 1023 and 1024.

In this second reduction mechanism unit, one rotation of the first shaft 1011 causes the rotation of both the eccentric bodies 1013a and 1013b. This urges the external gears 1015a and 1015b to oscillate and rotate about the first shaft 1011. However, since their free rotations are restricted by the internal gear 1020, the external gears 1015a and 1015b almost exclusively make oscillations while internally meshing with the internal gear 20.

Assuming that the number of teeth on the respective external gears 1015a, 1015b is N and the number of teeth on the internal gear 1020 is N+1, then the difference between the numbers of teeth is "1." Thus, each rotation of the first shaft 1011 shifts (rotates) the external gears 1015a and 1015b by the amount corresponding to one tooth with respect to the fixed internal gear 20. The result is that one rotation of the first shaft 1011 is reduced to $-1/N$ rotations of the external gears 1015a and 1015b.

The oscillating components in the rotations of the external gears 1015a and 1015b are absorbed by the clearances between the inner pin holes 1016a, 1016b and the inner pins 1017. On that account, only the rotational components are transmitted via the inner pins 1017 to the carriers 1023 and 1024, and finally to the second shaft 1012.

This consequently achieves speed reduction of $-1/N$ in reduction ratio (the negative sign represents a reverse rotation).

In this driving apparatus 1001, the first reduction mechanism unit 1004 also uses an oscillating internal meshing planetary gear structure, and has almost the same configuration as that of the second reduction mechanism unit 1006. For the sake of avoiding repetitive descriptions, like parts or members in this diagram are therefore designated by like reference numerals having the same lower two digits, and their constitutional, operational, and other detailed descriptions will be omitted here.

The first reduction mechanism unit 1004 is different from the second reduction mechanism unit 1006 chiefly in the provision of a single (singular row of) external gear 1315. The reason for the difference seems to be that the preceding stage is smaller in transmission capacity (transmission torque) as compared to the subsequent stage, so that even a single external gear can well satisfy the strength and other requirements.

A carrier 1324 on the output side of the first reduction mechanism unit 1004 is coupled to the first shaft 1011 of the second reduction mechanism unit 1006 by means of a spline structure. A first shaft 1311 of the first reduction mechanism unit 1004 is coupled to a drive shaft 1061 of the drive unit 1002.

The casing 1351 for accommodating the first reduction mechanism unit 1004 is composed of a central casing 1352, a joint casing 1353 on the side closer to the drive unit 1002, and the joint casing 1053 on the side closer to the second reduction mechanism unit 1006. Hence, it is the joint casing 1053 that integrally connects the first and second reduction mechanism units 1004 and 1006, and comprises parts of both the casings 1051 and 1351.

In the driving apparatus 1001 of the above-described constitution, the rotational power from the drive unit 1002 is decelerated in two steps by the first and second reduction mechanism units 1004 and 1006 both of oscillating internal meshing planetary gear structure, and then output though the second shaft 1012.

By the way, these conventional examples have been facing a common problem. That is, a reduction gear unit using this kind of internal meshing planetary gear structure, in which the external gears (or internal gear) make(s) relative oscillating rotations with respect to the mating gear(s), indeed has an advantage in that higher reduction ratios can be obtained from the simple, compact, high-rigiditied structure. However, such a reduction gear unit inevitably causes a high-noise problem due to the configuration that the external gears (or internal gear) make(s) oscillations while meshing with the mating gear(s).

In particular, since a reduction gear unit is connected to another external unit in actual use, these units produce resonance with each other to cause a problem of yet higher noise production.

For example, when the reduction gear unit is combined with a motor to constitute a geared motor as described above, the vibrations produced from the reduction gear unit vibrate the motor coupled to the unit. These vibrations are then combined with the vibrations generated by the motor itself to produce complex resonance. Moreover, these vibrations are sometimes returned to the reduction gear unit to generate more complex resonance, possibly causing the entire geared motor to produce extremely high noise.

In this regard, the geared motors in the above examples have already been provided with prevention measures against the resonance between the motor unit and the reduction gear unit(s) For example, in the example of FIG. 22, the motor shaft 61 and the first shaft 11 were put into floating connection with each other via the spline-type coupling 70 to block the mutual transmission of vibrations between the motor unit 3 and the reduction gear unit 2.

However, simply establishing a floating connection through the intervention of the coupling 70 could not achieve very successful suppression against the mutual transmission of the vibrations, failing to offer a sufficient noise reduction effect.

Besides, the geared motor of FIG. 23, using the internal meshing planetary gear structure of power-distributed shaft type, was actually operated and found that it also failed to offer a noise reduction effect as high as expected. The cause for this seems to be as follows:

In this power-distributed-shaft-typed structure, the respective power-distributed shafts 503 are subjected to vibrations and flexure accompanying the oscillating movements of the external gears 505. This inevitably increases the possibility that the power-distributed shafts 503 be vibrated or deformed (bent) under the loads from the external gears 505. Meanwhile, this geared motor still arranges on the power-distributed shafts 503 the power-distributed rollers 512 which are in press contact with the sun roller 511. As a result, the vibrations and deformations of the power-distributed shafts 503 are directly transferred to the power-distributed rollers 512 and then to the sun roller 511, whereby the effect obtained from the use of the friction rollers, of blocking the vibration transmission, is hampered from functioning successfully. In other words, the assignable cause seems to be the configuration that the rollers 512 suitable for high-speed, low-torque power transmission are directly arranged on the power-distributed shafts 503 which undergo the direct influence of the deformation accompanying the load transmissions in the internal meshing planetary gear structure.

In any case (regardless of the cause), the above-described conventional art, despite the incorporation of frictional rollers, ended up failing to achieve such a profound noise-improving effect as would renew the common knowledge.

In the meantime, the driving apparatus 1001 shown in FIG. 28 was capable of achieving extremely high reduction ratios by virtue of the first and second reduction mechanism units 1004 and 1006 both of oscillating internal meshing planetary gear structure. In this respect, the driving apparatus 1001 well satisfied the wide needs of the market. In other words, a feature of this driving apparatus 1001 was that the rotational power from the drive unit 1002 can be transmitted to the second shaft 1012 of the second reduction mechanism unit 1006 as maintained in coaxiality to offer extremely high output.

The driving apparatus 1001, however, was configured so that the new central and joint casings 1352 and 1353 were interposed between the second reduction mechanism unit 1006 and the drive unit 1002 to accommodate the first reduction mechanism unit 1004. This configuration caused a great axial extension of the entire apparatus and ended up with considerably high manufacturing costs.

Even in this driving apparatus shown in FIG. 28, both the first and second reduction mechanism units 1004 and 1006 were of reduction gear structures including gears (external internal gears). Therefore, when coupled to each other, these units produced a problem of greatly-increased noises. An assignable cause appears to derive from the configuration of simply coupling (linking) the casings 1051 and 1351 which have an internal space independent of each other. Here, noises inside the respective casings are resonated and amplified in both the internal spaces. Another cause appears to consist in that: like the examples of FIGS. 22 and 23 described before, the drive units 1002 and two reduction mechanism units 1004 and 1006, each having one or more peak frequencies different from those of the others, are coupled with one another to produce complex resonance phenomena.

By the way, the approaches to a two-stage reduction type attaining higher reduction ratios, other than the driving apparatus 1001 described above, seems to include the conversion of the first reduction mechanism unit into a parallel axis gear structure having spur gears in combination.

To attain a high reduction ratio, however, this parallel axis gear structure requires a greater center distance between the input-side gear (pinion) and the output-side gear so as to establish a larger difference in the number of teeth between the meshing gears. Then, in response to the center distance, the entire driving apparatus is expected to be greater in radial dimension (along with axial dimension). Besides, in order to make the drive unit (motor) and the output shaft coaxial with each other, the first reduction mechanism unit itself requires two stages of gears (three stages, for the entire apparatus) to correct the deviation of the shaft center, inevitably causing axial extension of the apparatus.

SUMMARY OF THE INVENTION

The present invention has been achieved in view of the foregoing problems. It is thus an object of the present invention to provide a driving apparatus which comprises an oscillating internal meshing planetary gear structure capable of great reduction in vibration and noise levels.

It is another object of the present invention to provide a driving apparatus which can achieve a reduction ratio higher than conventionals with greatly-reduced noises while suppressing an increase in size and cost as much as possible.

The foregoing objects of the present invention have been achieved by the provision of a driving apparatus comprising: an oscillating internal meshing planetary gear unit having an internal gear and an external gear making internal contact with the internal gear, the center of the internal gear lying inside the periphery of the external gear; and an external unit coupled to the oscillating internal meshing planetary gear unit so as to be capable of inputting (or extracting) power thereto (or therefrom). Between the oscillating internal meshing planetary gear unit and the external unit is interposed a frictional transmission unit for transmitting rotational power between the oscillating internal meshing planetary gear unit and the external unit by means of friction among a plurality of friction rollers making contact with each other. The friction roller unit is constituted by a simple planetary roller mechanism including the friction rollers consisting of a sun roller, a plurality of planetary rollers being retained by a planetary carrier and making rolling contact with the outer periphery of the sun roller, and a ring roller with which the plurality of planetary rollers make internal contact.

The essence of this driving apparatus consists of two points. One is that a frictional transmission unit is interposed between the oscillating internal meshing planetary gear unit and the external unit. The other is that a simple planetary roller mechanism is adopted for the frictional transmission unit.

It will become apparent from the following descriptions and test results that the present invention offers its inherent effect (beyond the bounds of common knowledge) only after the above-mentioned two points are combined with each other. In other words, either of the points by itself cannot offer such a beneficial effect.

Hereinafter, descriptions thereof will be given in further detail.

In this driving apparatus, initially, the frictional transmission unit of simple planetary roller structure is interposed between the oscillating internal meshing planetary gear unit and the external unit, and therefore the oscillating internal meshing planetary gear unit is low in input rotational speed in the first place. This allows reduction of the vibrations generated in the oscillating internal meshing planetary gear unit. In addition, the vibrations being transmitted between the units on both sides of the frictional transmission unit (in particular, the vibrations along the direction of rotation and the vibrations along the axial direction) can be absorbed by the contact surfaces of the friction rollers in the frictional transmission unit.

As a result, the complex resonance phenomena resulting from the vibration transmission between the oscillating internal meshing planetary gear unit and the external unit can be avoided to reduce the level of the noises produced by the entire driving apparatus.

Put another way, since a third unit (the frictional transmission unit), which may be regarded as a detour circuit for blocking the vibration transmission, is deliberately interposed between the oscillating internal meshing planetary gear unit and the external unit, it becomes possible to effectively suppress both the vibration transmissions from the oscillating internal meshing planetary gear unit to the external unit and from the external unit to the oscillating internal meshing planetary gear unit, with the result of overall noise reduction.

Here, what is important is that a simple planetary roller mechanism is adopted for the frictional transmission unit.

More specifically, the simple planetary roller mechanism employed here for the frictional transmission unit carries out the rotational power transmission by means of the friction among the contact surfaces of rollers, particularly owing to the power transmission structure peculiar to the simple planetary roller mechanism which involves rotations and revolutions of the planetary rollers. Therefore, the respective contact surfaces and the portions in which the planetary carrier supports the planetary rollers can absorb the vibrations (in particular, those along the direction of rotation and those along the axial direction) under the mutual transmission between the units on both sides of the frictional transmission unit (namely, the oscillating internal meshing planetary gear unit and the external unit).

The above-mentioned driving apparatus of power-distributed shaft type shown in FIG. 23 did use friction rollers as well. However, the power-distributed shaft type did not have the simple planetary roller mechanism, but a structure in which the power-distributed rollers 512 sandwiched between the sun roller 511 and the press-contact ring 513 were inherently apt to pick up vibrations of the power-distributed shafts 503. Accordingly, with the vibrations and flexure of the power-distributed shafts 503, the power-distributed rollers 512 made position shifts and vibrations to preclude the proper power transmission (without speed fluctuations) with the sun roller 511. The result was that the vibrations of the power-distributed rollers 512 themselves affected the overall vibrations and noises before the rollers 512 fulfilled their vibration absorbing function over the frictional contact surfaces.

In other words, this apparatus was not originally based on the philosophy of resonance avoidance. Therefore, the apparatus had such a configuration that the vibrations from the power-distributed shaft 503 were directly transmitted to the power-distributed rollers 512 and then to the sun roller 511, and lacked a structure for achieving the object of the present invention to avoid resonance by suppressing vibration transmission.

On this account, even the incorporation of the friction rollers did not help achieve a noise-improving effect as profound as would renew the common knowledge of geared motors. This ended up with a belief that "friction rollers can only offer such an effect at best," and the development was discontinued without further scrutiny.

On the contrary, in the case of the present invention in which a simple planetary roller mechanism is adopted for the frictional transmission unit, the power transmission is carried out by means of relative movements among the three parties, namely, the sun roller at the inner side, the ring roller at the outer side, and the planetary rollers interposed therebetween (instead of the direct power transmission by means of the power-distributed rollers' rotations themselves). On this account, the frictional transmission unit need not undergo unnecessary deformation or vibrations from the oscillating internal meshing planetary gear unit directly.

Hence, even though interposed between the sun roller and the ring roller, the planetary rollers make only rolling contact with the sun and ring rollers at a pressure necessary for frictional transmission. The frictional contact surfaces are small in pressure fluctuation. As a result, the vibration transmission through the frictional transmission unit is suppressed. In addition, the frictional contact surfaces effectively fulfill their vibration absorbing function as described before to block the mutual vibration transmission among the units, thereby offering a high effect for noise reduction. The adoption of the simple planetary roller mechanism also permits the input and output portions of the frictional transmission unit to be arranged coaxially with each other. Thus, for example, the coupling portion between the sun roller and the external unit and the coupling portion between the planetary carrier and the oscillating internal meshing planetary gear unit can be arranged on the same axis.

This coaxiality particularly means a structure in which the aforementioned loads from the external gears are exerted exclusively on the single shaft at the central portion of the unit (unlike the power-distribution shaft type). The coaxiality is therefore beneficial in that simply increasing the rigidity of the central portion can enhance the rigidity of the entire unit. It is also beneficial in terms of vibration block because the vibrations from the external gears can be concentrated on the single, high-speed shaft, and coupling this high-speed shaft to an end of the frictional transmission unit can complete the connection with the frictional transmission unit.

In other words, the simple, compact structure not only is capable of enhancing the rigidity to beneficially allow higher torque transmission by that much, but also is advantageous in terms of noise reduction.

This coaxiality is also beneficial in making the present invention readily applicable to a geared motor in which the drive shaft of its external unit and the input and output shafts of its oscillating internally meshing planetary gear unit are aligned on a single center axis. For example, the driving apparatus of the present invention can be easily realized by adding a frictional transmission unit of the above-described simple planetary roller mechanism type to between the motor unit 3 and the oscillating internal meshing planetary gear unit 2 of the conventional geared motor 1 shown in FIG. 22. In the geared motor 1 in FIG. 22, the motor shaft 61 and the first shaft 11 of the oscillating internal meshing planetary gear unit 2 were coupled by the coupling 70. This coupling 70 may be diverted to couple the carrier of the simple planetary roller mechanism and the oscillating internal meshing planetary gear unit or to couple the shaft of the sun roller and the drive shaft of the external unit.

In addition, the adoption of the simple planetary roller mechanism makes it possible to obtain a given reduction ratio at this stage. Thus, the simple planetary roller mechanism at the preceding stage can be combined with the oscillating internal meshing planetary gear unit at the subsequent stage to achieve higher reduction ratios easily. Unlike gears, the simple planetary roller mechanism is easy to set the reduction ratio finely. This allows easy provision of a series of geared motors with many steps of reduction ratios, or a geared motor having a particular reduction ratio corresponding to a specific application.

Here, the torque transmission by means of frictional transmission at the preceding stage cannot secure as much transmission torque as the torque transmission by means of gear meshing at the subsequent stage does. This, however, makes little difference because of the following two reasons. First, the amount of torque to transmit in the preceding-stage reduction is inherently rather small. Second, the simple planetary roller mechanism, as described later, is adjustable in the torque for each roller to transmit by choosing the input and output members.

In particular, the simple planetary roller mechanism can support its planetary rollers by using a planetary carrier which is separate from the members of the oscillating internal meshing planetary gear unit. Accordingly, even when the oscillating internal meshing planetary unit undergoes some vibrations and deformation, little influence reaches the roller contact surfaces of the simple planetary roller mechanism. This realizes the torque transmission with reliability and stability, further reducing the possibility of problems arising.

Now, the driving apparatus of the present invention may be used with an external unit connected to either the high- or low-speed shaft side of the oscillating internal meshing structure, or to both. Since the highest vibrations are generated at the high-speed shaft side, the present invention is particularly effectively applied with an external unit connected to the high-speed shaft side.

The external units include machines to be driven, aside from drive sources such as a motor. The following are examples of the unit connection.

In the case where the oscillating internal meshing planetary gear unit is used as reduction gears, its high-speed shaft side is coupled with a motor as the drive source, and its low-speed shaft side is coupled with a machine to be driven. This is the typical usage of a geared motor. In the case where the oscillating internal meshing planetary gear unit is used as step-up gears, the low-speed shaft side is coupled with the drive source and the high-speed shaft side is coupled with the machine to be driven. Then, the present invention is applied to between units that may produce resonance.

Specifically, when resonance may occur between the drive source and the oscillating internal meshing planetary gear unit in mutual coupling, the frictional transmission unit is interposed between the drive source and the oscillating internal meshing planetary gear unit. When resonance may arise between the machine to be driven and the oscillating internal meshing planetary gear unit, the frictional transmission unit is interposed between the machine to be driven and the oscillating internal meshing planetary gear unit. By so doing, the overall vibrations and noises can be reduced.

The frictional transmission unit accomplishes the power transmission by means of the friction among the friction rollers. Thus, a desired reduction ratio can be obtained from this unit by properly modifying the diameters of the friction rollers contacting one another. Frictional transmission, however, is not suitable for high torque transmission. Therefore, this unit is favorably used, e.g., for the preceding-stage reduction mechanism in the cases where the oscillating internal meshing planetary gear unit is operated for speed reduction. By so doing, the overall, total reduction ratio can be set at higher levels.

Now, the ways to support the planetary rollers in the aforementioned simple planetary roller mechanism includes the following two.

In one way, the planetary carrier in the simple planetary roller mechanism is provided with a retainer for occupying spaces around the plurality of planetary rollers to retain the planetary rollers at constant mutual positions (hereinafter, referred to as retainer type).

In the other, the planetary carrier in the simple planetary roller mechanism is provided with pins for penetrating through the respective centers of the planetary rollers to retain the planetary rollers at constant mutual positions (hereinafter, referred to as pin type).

As for the differences between the retainer type and the pin type, the pin type is superior to the retainer type in: (a) power transmission efficiency, (b) power transmission stability, and (c) allowance for torsion and mounting errors. The reason for this is that the pin type has a structure of fitting the planetary rollers on the outer peripheries of the pins via bearings so that it is easy for the planetary rollers to maintain higher rotational performance than in the retainer type.

In addition, the effects (a)–(c) suggest that the pin type also generally offers more favorable properties as to "the vibration suppressing effect" for a long term as compared to the retainer type.

However, as far as "the vibration suppressing effect" is concerned, there is a possibility of making the retainer type offer a better effect than the pin type does, depending on the design and maintenance. The reason for this seems to be that the retainer type, as described later, has the output-extracting retainer which is kept out of press contact with the sun roller and the ring roller, or put in a sort of free state, to exclusively receive circumferential driving forces from the planetary rollers. This retainer structure makes it possible to avoid the vibration transmissions through the following two paths:

a) pins (oscillating-internal-meshing-planetary-gear-unit side)→planetary rollers→sun roller (motor side); and b) pins (oscillating-internal meshing-planetary-gear-unit side)→planetary rollers→ring roller (casing side).

Accordingly, vibrations can be intercepted between the oscillating internal meshing planetary gear unit and the external unit with yet higher reliability.

The relationship among the fixed, input, and output elements of the simple planetary roller mechanism creates the possible combinations shown in the table of FIG. 16. To name the combinations:

1) With the sun roller as the input element, the ring roller makes the fixed element and the planetary carrier the output element, or the ring roller makes the output element and the planetary carrier the fixed element;

2) With the planetary carrier as the input element, the ring roller makes the fixed element and the sun roller the output element, or the ring roller makes the output element and the sun roller the fixed element; and 3) With the ring roller as the input element, the planetary carrier makes the fixed element and the sun roller the output element, or the planetary carrier makes the output element and the sun roller the fixed element.

The simple planetary roller mechanism prefers that the ring roller make the fixed element, either the planetary carrier for supporting the plurality of planetary rollers or the sun roller the input element, and the remaining the output element.

When the fixed element is thus made of the ring roller arranged on the periphery, this ring roller has only to be fixed to the casing, thereby allowing rather simple configuration for the mechanism.

It is also preferable that: the above-mentioned external unit be a motor unit for supplying a rotational input to the oscillating internal meshing planetary gear unit; the frictional transmission unit be interposed between a drive shaft of the motor unit and the oscillating internal meshing planetary gear unit; and the oscillating internal meshing planetary gear unit and the motor unit be integrally connected with each other by a joint casing comprising parts of the casings for these units, the frictional gearing unit being arranged inside the joint casing.

Given that the external unit is a motor unit, the drive shaft of the motor unit is connected to the high-speed shaft side of the oscillating internal meshing planetary gear unit when the planetary gear unit is used as reduction gears. In short, there is constituted a typical geared motor. Then, in such a geared motor, the vibration amplifying effect resulting from resonance can be avoided by interposing the frictional transmission unit between the high-speed shaft of the oscillating internal meshing planetary gear unit and the drive shaft of the motor unit to block the vibration transmission between the motor unit and the oscillating internal meshing planetary gear unit.

By the way, in typical composition of a geared motor, the casing of the oscillating internal meshing planetary gear unit and the casing of the motor unit are coupled with each other to form an integrated geared motor. In conventional cases, both the units are coupled via a joint casing that comprises a part of the casing of each unit (see Japanese Patent Laid-Open Publication No.Hei 5-231482).

Therefore, the newly-added frictional transmission unit can be arranged inside that joint casing to permit its easy incorporation without a significant change in the structures of the units on both sides.

Of the coupling portions between the frictional transmission unit and the oscillating internal meshing planetary gear unit and between the frictional transmission unit and the external unit, at least one coupling portion preferably has a floating connection structure.

According to this constitution, the shaft coupling portion of the frictional transmission unit with the oscillating internal meshing planetary gear unit or the external unit has a floating connection structure. Therefore, the vibrations caused by each unit's oscillations can be prevented from acting on the frictional rollers via the coupling portion, thereby suppressing fluctuations in the contact pressure between the friction rollers. This permits the stable, sure torque transmission with no fluctuations in transmission torque in the frictional transmission unit.

Here, it is yet preferable that: of the coupling portions between the planetary carrier in the frictional transmission unit of simple planetary roller mechanism and the oscillating internal meshing planetary gear unit and between the sun roller and the external unit, at least the coupling portion between the planetary carrier and the oscillating internal meshing planetary gear unit has the floating connection structure.

Specifically, according to this constitution, at least the coupling portion between the planetary carrier and the oscillating internal meshing planetary gear unit is provided with the floating structure to minimize the transmission of radial vibrations from the oscillating internal meshing planetary gear unit to the single planetary roller mechanism in the case where the ring roller of the simple planetary roller mechanism makes the fixed element, the planetary carrier is coupled to the oscillating internal meshing planetary gear unit, and the sun roller is coupled to the external unit. Consequently, further suppression of the mutual vibration transmission between the oscillating internal meshing planetary gear unit and the external unit can be achieved to avoid the resonance problem.

The above-mentioned floating connection structure may employ a spline connection structure, for example. This facilitates the realization of the structure, for a floating connection state can be obtained from the splines, a commonly available shaft-coupling structure.

Incidentally, other examples of the floating connection structure include a gear connection.

As described above, the relationship among the fixed, input, and output elements in a simple planetary roller mechanism have the combinations shown in FIG. 16. Of these, the constitutions in which the ring roller of the single planetary roller mechanism makes the fixed element with either the planetary carrier supporting the plurality of planetary rollers or the sun roller as the input element and the remaining as the output element (the constitutions corresponding to A and C in FIG. 16) particularly provide various advantages when combined with the assembly that utilizes a structure of forming a mounting reference surface.

That is, when the fixed element is made of the ring roller arranged on the periphery, it is possible to fix this ring roller of greatest dimension to the casing. This basically allows simpler structures for both the simple planetary roller mechanism and the casing, and achieves further noise reduction.

The structure of forming a mounting reference surface is preferably adopted due to the following reason.

In its process of contrivance, the driving apparatus according to the present invention used common assembling means to fix the ring roller to the casing. Specifically, a cylindrical accommodating portion having an inside diameter somewhat smaller than the outside diameter of the ring roller was formed in the casing, and the ring roller was "press-fitted" and fixed to the accommodating portion. However, tests revealed that the method of fixing the ring roller by "press-fit" had a considerable number of problems. The reason for this seems to be as follows:

(1) In view of miniaturization, the ring roller needed to have a thickness as small as possible. When such a ring roller was subjected to the method of fixing by pressing, the ring roller might be deformed radially inwardly. This radially inward deformation could produce fluctuations in contact pressure (line pressure) both on the contact surfaces between the planetary rollers and the ring roller and on the contact surfaces between the planetary rollers and the sun roller. As a result, the value of the contact pressure (line pressure) after actual mounting of the ring roller differed from the value of the contact pressure predetermined before the incorporation. In particular, the actual pressure fluctuated in accordance with circumferential positions, thereby precluding smooth rotations/revolutions of the planetary rollers.

(2) Under the circumstances where the high-rigidity casing exerted high pressures on the ring roller from radial outsides, the majority of the radial vibrations having been transmitted to the planetary rollers (through the sun roller or the planetary carrier) were transmitted as-received to the mating side through the planetary carrier or the sun roller.

In other words, the ring roller under the press-fitted state had little allowance in bending (distorting) itself slightly in the radial direction. Thus, in this driving apparatus (under the process of contrivance) having the ring roller fixed by press-fit, the majority of the radial vibrational energy having been received by the planetary rollers via the planetary carrier was "directly" transmitted to the sun roller while the majority of the radial vibrational energy having been received by the planetary rollers via the sun roller was "directly" transmitted to the planetary carrier. In particular, a so-called "transmission structure for radial vibrational energy" was formed in the simple planetary roller mechanism.

(3) The vibrations having been transmitted to the ring roller were then transmitted to the casing with a high possibility of vibrating the casing.

That is, after the fixing by press-fit, the vibrations having been transmitted to the ring roller would directly vibrate the cylindrical surface of the roller in radial directions (the direction of the thickness) against the casing of generally cylindrical shape. Accordingly, the casing could easily cause resonance, which was transmitted to the casings of the external unit and the internal meshing planetary gear unit to induce resonance of the entire driving apparatus.

However, when the press-fit fixing is abandoned and substituted with the assembly by using a mounting reference surface, the mounting deformation of the ring roller resulting from the press-fit can be minimized to maintain the uniformity and stability of the tangential line pressures. At the same time, vibrations of the ring roller itself can be allowed to some extent to achieve energy absorption there. In addition, these vibrations can be surely received by the mounting reference surface (of higher rigidity in the radial direction) formed along the direction of the casing's thickness (or by a surface conforming thereto, to be described later) so that the vibrations are prevented from being transmitted directly in the direction of the casing's thickness.

In other words, the ring roller can be fixed to the casing without undergoing radial pressures, or as pressed against the mounting reference surface perpendicular to the axial direction, to realize smooth rotations/revolutions of the planetary rollers. Moreover, the ring roller's capacity for radial deformation can provide a radial vibration absorbing function to the ring roller itself and minimize vibrations of this ring roller being transmitted to the casing side, thereby achieving further noise reduction.

This type of method for fixing the ring roller is highly advantageous in terms of noise suppression, as described previously. In addition to this simple noise reduction, the method also eliminates the need for the process of press-fitting the ring roller, thereby improving the assembling efficiency.

Here, the ring roller may be configured to be adjustable in axis position within the mounting reference surface. In such a configuration, the axis of the ring roller can be readily adjusted to coincide with the axes of the respective power transmission shafts of the oscillating internal meshing planetary gear unit and external unit to which the frictional transmission unit is coupled. This allows quicker, easier assembly of the frictional transmission unit. More specifically, when the ring roller was mounted by press-fit, the axis adjustment (alignment) was impossible unless the oscillating internal meshing planetary gear unit and the external unit were displaced. On the other hand, when the ring roller is free from radial pressures and is provided with enough spaces for radial displacement as in the present invention, the axis is easy to adjust, and therefore assembling efficiency is improved dramatically.

Moreover, in order to draw the best out of the coaxiality which is the merit of the present invention, the sun roller may be provided with a sun-roller-side shaft insertion hole into which a power transmission shaft of the external unit is insertable, and the planetary carrier is provided with a carrier-side shaft insertion hole into which a power transmission shaft of the oscillating internal meshing planetary gear unit is insertable, so as to form the frictional transmission unit into a shaft coupling structure for allowing relative rotations of the power transmission shafts.

Such constitution is highly advantageous in the following aspect. That is, the coaxiality between the input and output elements of the simple planetary roller mechanism makes the present invention easily applicable to a geared motor that has a now-commonly-known structure in which the drive shaft of the external unit and the input and output shafts of the oscillating internal meshing planetary gear unit are aligned on a single center axis and these units are coupled with each other by an ordinary coupling.

For example, in the conventional geared motor 1 as shown in FIG. 22, the motor shaft 61 of the motor unit 3 and the first shaft 11 of the oscillating internal meshing planetary gear unit 2 are coupled with each other by a common coupling (shaft coupling). Geared motors of such structure are not limited to that shown in FIG. 22. Most of the conventional driving apparatuses containing an oscillating internal meshing planetary gear unit and an external unit have similar structures. Under such circumstances, the frictional transmission unit provided with the "shaft coupling structure" by forming shaft insertion holes in the carrier and sun roller can be employed and replaced with the ordinary coupling to easily realize the driving apparatus of the present invention with only slight changes in design. Moreover, the simple planetary roller mechanism can be realized into an axially compact configuration, causing no axial extension of the entire driving apparatus.

In particular, the application of the "shaft coupling structure" to a frictional transmission unit is combined with the adoption of a mounting reference surface to allow the frictional transmission unit to be replaced by another frictional transmission unit of different reduction ratio, with almost the same trouble as that required in replacing ordinary couplings. Therefore, it becomes possible to flexibly adapt this driving apparatus to user demands for a wide range of reduction ratios. Here, what needs to be replaced is the frictional transmission unit alone; therefore, the replacement costs less as compared to the replacement of the entire geared motor.

In the frictional transmission unit of "shaft coupling structure," at least either the sun-roller-side shaft insertion hole or the carrier-side shaft insertion hole is formed into a floating connection structure with respect to the power transmission shaft inserted therethrough. This realizes the aforementioned floating connection structure on the shaft coupling portion of the frictional transmission unit with the oscillating internal meshing planetary gear unit or the external unit.

In particular, the ring roller of this frictional transmission unit is fixed to the casing on the basis of the mounting reference surface. Therefore, unlike ordinary couplings which are simply fitted onto shafts to keep their own positions (by being supported by the shafts in return), such as those shown in FIGS. 22 and 23, this frictional transmission unit can keep its own position independent of the power transmission shafts. As a result, each power transmission shaft and the corresponding shaft insertion hole can maintain a constant clearance therebetween all the time, further ensuring the blockage of vibrations and noises. Given that this frictional transmission unit is adjustable in axis, the clearances can also be set precisely from the beginning. This combines with the maintenance of constant clearances to achieve further suppression of noises and vibrations.

In a concrete method for fixing the ring roller to the casing, the ring roller is provided with a bolt hole piercing therethrough in the direction of the rotation axis so that the ring roller is fixable to the mounting reference surface by a fixing bolt inserted through the bolt hole and threadedly engaged with a tapped hole formed in the mounting reference surface. Here, the bolt hole has a diameter somewhat greater than that of the fixing bolt so that the ring roller is adjustable in axis position within the mounting reference surface as long as the fixing bolt is fitted to the bolt hole with play.

This allows the ring roller to be surely fixed by the most common means, or bolts, with no particular increase in manufacturing costs. Besides, since the axis position of the ring roller can be adjusted by the simpler method, suppression in cost is possible and the assembly is facilitated.

Furthermore, the planetary carrier of the simple planetary roller mechanism may be provided with pins which penetrate through center holes formed at the rotational centers of the respective planetary rollers to retain the planetary rollers at constant mutual positions. Then, an inner roller of generally cylindrical shape is inserted to the clearance between the outer peripheral surface of each pin and the inner peripheral surface of the corresponding center hole so that the inner roller makes sliding rotation with respect to both the peripheral surfaces.

In such constitution, the inner rollers can make rotations while sliding over the outer peripheral surfaces of the pins and the inner peripheral surfaces of the planetary rollers, to absorb the difference in rotational speed between the pins and the planetary rollers. More specifically, the inner rollers inserted to between the pins and the planetary rollers make rotations at a speed intermediate between the revolving speed of the pins and the rotating speed of the planetary rollers. Therefore, as compared to the case where the pins and the planetary rollers are in "direct" contact with each other, the inner and outer contact surfaces of the inner rollers slide at a speed differential smaller than the actual difference in rotational speed between the pins and the planetary rollers. This consequently allows reductions of frictional heat generation, frictional resistance, and the like.

The inner rollers also offer superior strength as compared to needle rollers, thereby enhancing the durability in long run and high-speed rotations.

The present invention has been described so far in terms of inter-unit coupling. As described below, another aspect of the present invention consists in a driving apparatus separated from external units.

That is, the present invention may also be regarded as comprises: a rotating shaft (214, 414 in the embodiment) to be connected to an external unit; an oscillating internal meshing planetary gear mechanism having an internal gear and an external gear making internal contact with the internal gear, the center of the internal gear lying inside the periphery of the external gear; and a frictional transmission unit of simple planetary roller mechanism, having friction rollers consisting of a sun roller, a plurality of planetary rollers being retained by a planetary carrier and making rolling contact with the outer periphery of the sun roller, and a ring roller having the planetary rollers arranged inside so as to make internal contact. Here, one of the sun roller, planetary carrier, and ring roller is fixed. Either of the other two is coupled to the oscillating internal meshing planetary gear mechanism. The remaining one is coupled to the rotating shaft.

Again, it is preferable that: the ring roller is fixed, the planetary carrier is coupled to the oscillating internal meshing planetary gear mechanism, and the sun roller is coupled to the rotating shaft. Of the coupling portions between the planetary carrier and the oscillating internal meshing planetary gear mechanism and between the sun roller and the rotating shaft, at least one coupling portion preferably has a floating connection structure.

For the above-mentioned oscillating internal meshing planetary gear mechanism, an oscillating internal meshing planetary gear mechanism may be adopted which has a first shaft and a second shaft located on the center axis of the driving apparatus. Here, an external gear is fitted on the outer periphery of the first shaft via an eccentric body so as to be capable of oscillating rotations with respect to the first shaft. An internal gear with which the external gear meshes internally is provided concentrically with the first shaft. The second shaft is coupled to the external gear via means for extracting only the rotational component of the external gear.

Incidentally, focusing attention on the combination of "a frictionally-engaging unit and a floating connection" can also result in a frictional transmission unit 2300 as shown in FIG. 21, for example. In the diagram, the reference numeral 2301 represents the input-side shaft to be connected to a motor shaft 2161 via a floating connection portion F1, the numeral 2302 an input-side roller arranged on the shaft 2301, the numeral 2303 the output-side shaft to be connect to a first shaft 2111 of a reduction gear unit 2102 via a floating connection portion F2, and the numeral 2304 an output-side roller arranged on the shaft 2303. The reference numeral 2305 represents the idle shaft arranged in parallel to the aforementioned input- and output-side shafts 2301 and 2303. On this shaft 2305 are arranged first idle roller 2306 and second idle roller 2307 coming into contact with the aforementioned input- and output-side rollers 2302 and 2304, respectively.

This frictional transmission unit 2300 transmits rotations of the motor shaft 2161 in such order that: floating connection portion F1→input-side shaft 2301→input-side roller 2302→first idle roller 2306→idle shaft 2305→second idle roller 2307→output-side roller 2304→output-side shaft 2303→floating connection portion F2→first shaft 2111.

At first glance, the frictional transmission unit 2300 and the floating connections in combination appear to offer a noise reduction effect. And this configuration indeed produced some effect. However, the noise reducing effect produced was not as "dramatic" as that of the present invention.

Now, the following is one of the constitutions effective for the most rational realization of the present invention.

That is, a driving apparatus comprising a drive unit for generating rotational power, a first reduction mechanism unit coupled to an output shaft of the drive unit to transmit the rotational power, and a second reduction mechanism unit of support carrier transmission type, including reduction gears to be coupled to the first reduction mechanism unit, and a pair of support carriers rotatably supported by a casing at both axial outsides of the reduction gears via bearings, the support carriers for extracting rotational power of the reduction gears, wherein: the above-mentioned first reduction mechanism unit has a simple planetary roller structure of friction transmission type, including a sun roller to be coupled to a drive shaft of the drive unit, a planetary roller making rolling contact with the outer periphery of the sun roller, a ring roller with which the planetary roller makes internal contact, and a planetary carrier for extracting the revolution component of the planetary roller and transmitting the same to an input shaft of the second reduction mechanism unit, the outside diameter of the ring roller being set within the outside diameter of the bearing supporting the drive-unit-side support carrier of the pair of support carriers in the second reduction mechanism unit; and the above-described ring roller is situate within the casing, in a space on the drive-unit side of the bearing.

In short, the first reduction mechanism unit serving as the preceding reduction side of the driving apparatus is constituted as a simple planetary roller mechanism of frictional transmission type, and the outside diameter of the ring roller in the first reduction mechanism unit is set within the outside diameter of the bearing in the second reduction mechanism unit. This makes it possible to couple the first and second reduction mechanism units to each other with a highly compact configuration.

When this constitution is adopted, the space within the casing, on the drive-unit side of the bearing can be so expanded as to accommodate the simple planetary roller mechanism, with only an extremely simple change in design (namely, just a little extension of the casing). Moreover, this expanded space has little effect on the size of the entire driving apparatus.

Setting the outside diameter of the ring roller within that of the above-mentioned bearing makes the ring roller mountable to the casing from the side opposite to the drive unit (with the bearing detached), i.e., from the side closer to the second reduction mechanism unit to be mounted later. This greatly simplifies the internal configuration of the casing, and significantly facilitates the manufacture and assembly of the apparatus (the manufacturing and other methods will be described later).

Accordingly, it becomes possible to arrange the first reduction mechanism unit of simple planetary roller mechanism into the space on the drive-unit side of the bearing, within the same casing as that containing the second reduction mechanism unit. Therefore, the first and second reduction mechanism units can be combined with each other to achieve reduction ratios high enough to meet the market needs while greatly decreasing the axial dimension and reducing the manufacturing costs as compared to the conventional ones. Obviously, the driving apparatus constituted as described above can output the power of the drive unit without losing the coaxiality. The driving apparatus undergoes no increase in radial dimension.

Furthermore, this driving apparatus can realize the inherent, as-provided effects of the present invention. That is, the first reduction mechanism unit, because of being a frictional transmission type, is capable of quiet operation. In addition, both the first and second reduction mechanism units can be accommodated in a single casing. Therefore, the resonance and other phenomena conventionally caused by the internal spaces of two casings can be suppressed. Moreover, since the vibration transmission between the drive unit (motor) and the second reduction mechanism unit is blocked due to the presence of the first reduction mechanism unit of frictional transmission type, the resonance in the respective units is lowered and operational noises are reduced. The result is that the three requirements having been regarded as difficult to meet, i.e., a high reduction ratio, a compact configuration, and quietness, can be satisfied rationally.

Constituting the driving apparatus as described above also achieves a considerable simplification of the manufacturing steps. The concrete manufacturing method comprises the steps of: mounting the drive unit on the casing; attaching the first reduction mechanism unit to this casing with the drive unit mounted thereon, from the side opposite to the drive unit; and attaching the second reduction mechanism unit to the casing with the first reduction mechanism unit attached thereto.

This manufacturing method is highly labor-saving because the first and second reduction mechanism units (coaxial with each other) can be sequentially built in with reference to the drive shaft of the drive unit which has been fixed to the casing initially.

In particular, the simple planetary roller structure adopted for the first reduction mechanism unit and the oscillating internal meshing planetary gear structure adopted for the second reduction mechanism unit, both are high in modularity. Therefore, these units can be independently assembled to some extent before built into the casing together. Moreover, both the structures are intended for coaxial transmission of the rotational power, they facilitate the positioning and permit quick assembly.

In terms of the assembly facilitation, it is preferable that both the coupling structures between the output shaft of the drive unit and the sun roller of the first reduction mechanism unit and between the planetary carrier of the first reduction mechanism unit and the first shaft of the second reduction mechanism unit have a spline connection structure for allowing axial play. By this means, the first and second reduction mechanism units hardly require fine-adjustment in their mounting steps, and thus can be assembled still more easily and quickly.

The second reduction mechanism unit of this driving apparatus essentially has a support carrier transmission type structure, which includes a speed reducer to be coupled to the first reduction mechanism unit, and a pair of support carriers rotatably supported by the casing at both axial outsides of the speed reducer via bearings to extract the rotational power of the speed reducer. As a matter of course, even an oscillating internal meshing planetary gear structure of support carrier transmission type is similarly applicable to the second reduction mechanism unit. This constitution may also be combined with the above-described constitution for the "mounting reference surface."

The nature, principle, and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 9 is a chart listing the types of geared motors prepared as samples for noise measurement;

FIG. 10 is a table showing the noise measurements;

FIGS. 12(a) through 12(f) are charts showing noise spectra by type;

FIGS. 13(a) through 13(f) are charts showing noise spectra by type;

FIGS. 14(a) through 14(f) are charts showing noise spectra by type;

FIGS. 15(a) through 15(f) are charts showing noise spectra by type;

FIG. 16 is a chart listing the input-output-fixed combinations selectable for a simple planetary roller apparatus;

DETAILED DESCRIPTION OF THE PREFERRED EMBODIMENTS

Hereinafter, preferred embodiments of the present invention will be described with reference to the accompanying drawings.

Figure 1:
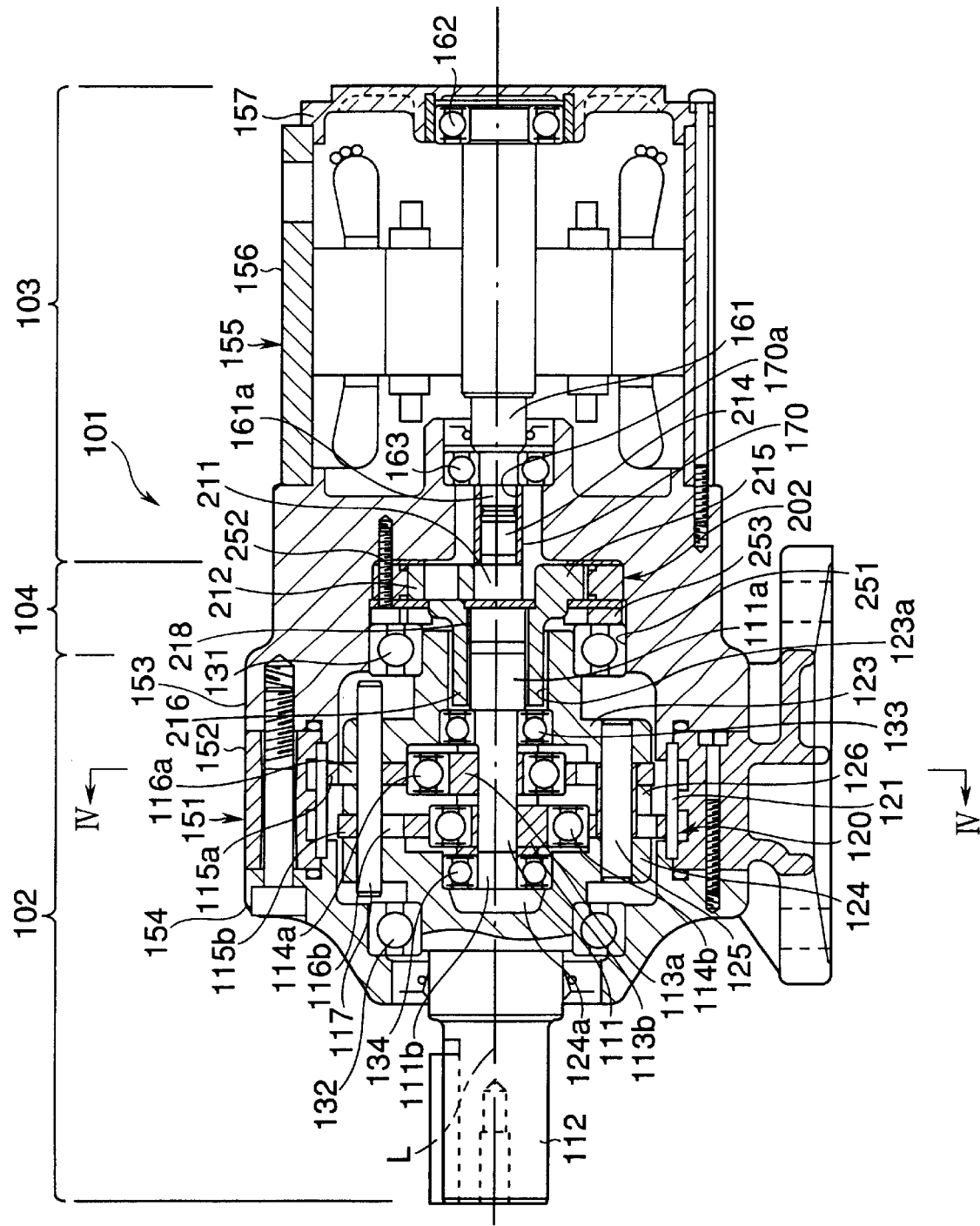
FIG. 1 is a sectional view of a geared motor shown as an embodiment of the present invention.
Figure 2:
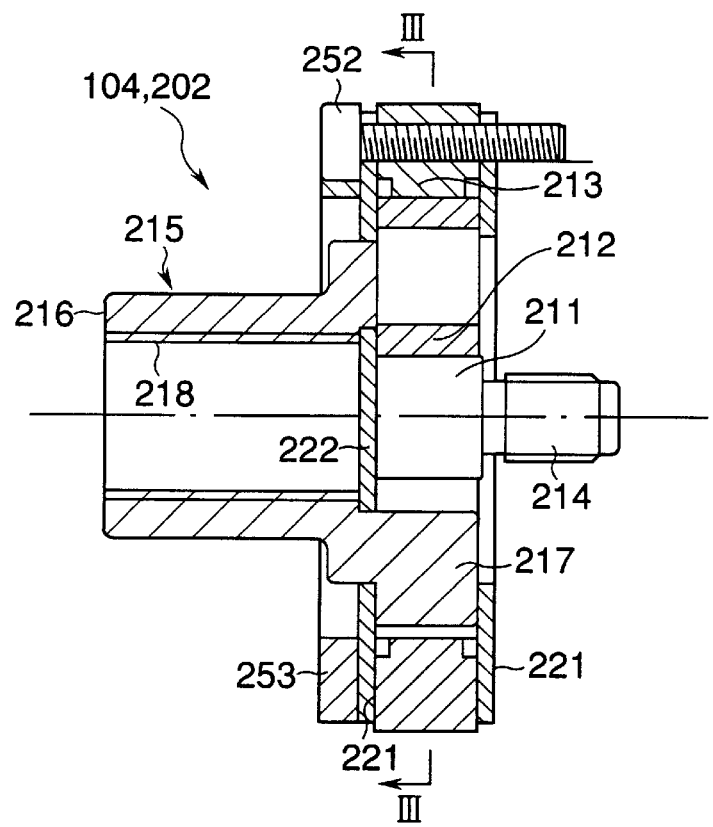
FIG. 2 is a sectional view of the frictional transmission unit (the simple planetary roller mechanism) in the geared motor.
Figure 3:
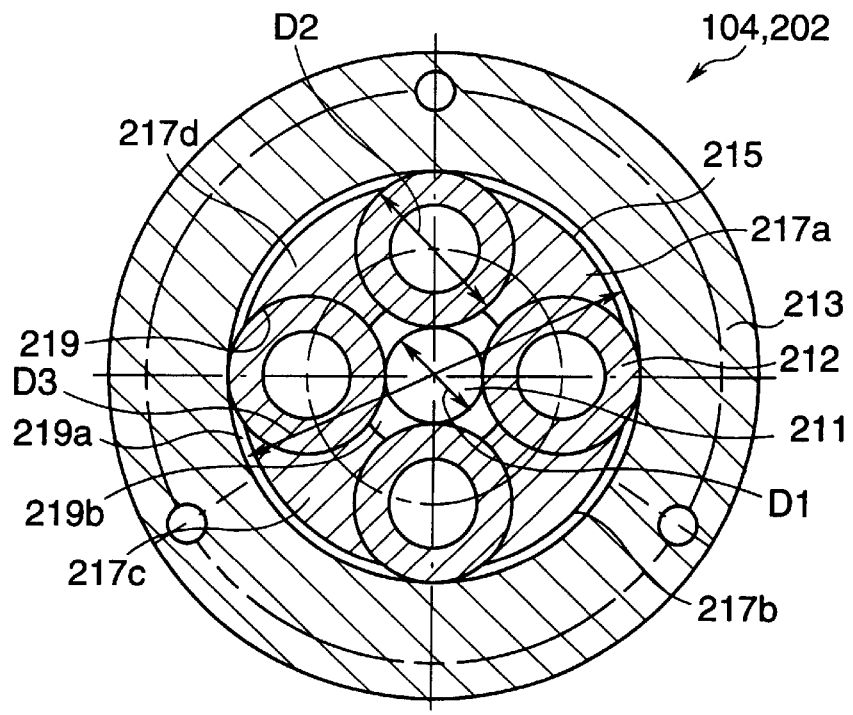
FIG. 3 a view taken along the arrowed line III—III of FIG. 2.
Figure 4:
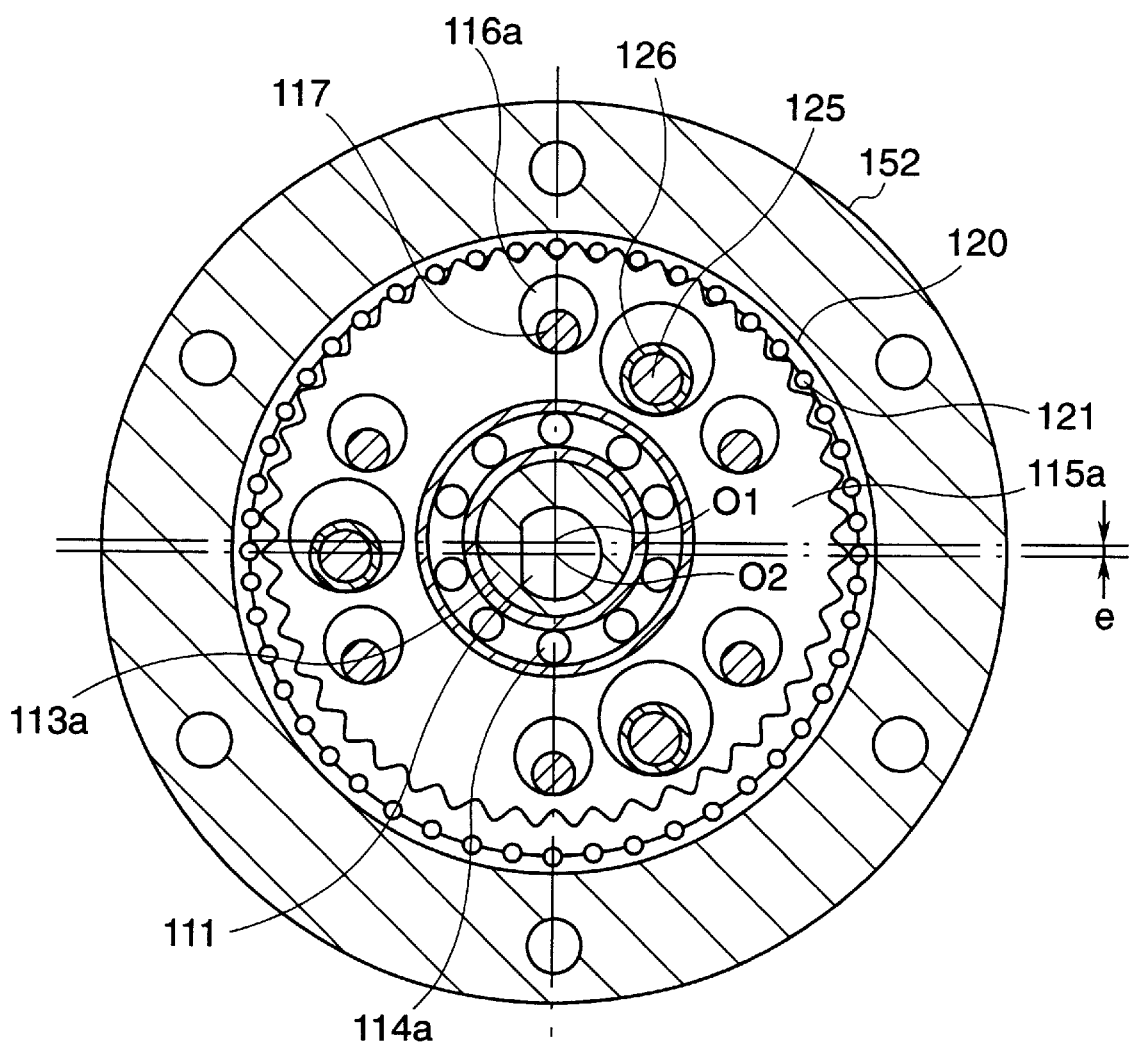
FIG. 4 is a sectional view taken along the allowed line IV—IV of FIG. 1.
Figure 5:
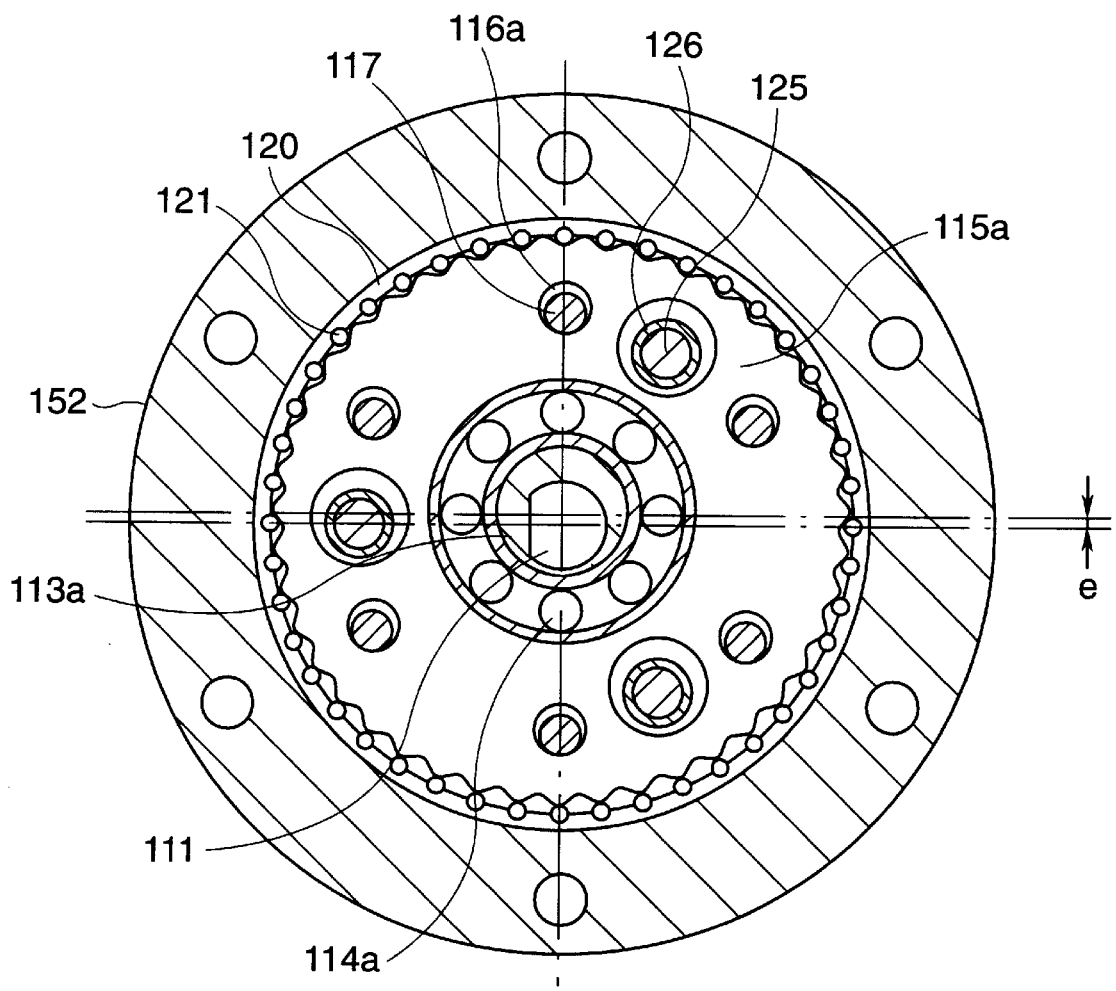
FIG. 5 is a view similar to FIG. 4, showing a configuration for another reduction ratio.

FIG. 1 is a sectional view of the geared motor shown as an embodiment, and FIG. 2 is an enlarged sectional view of the frictional transmission unit (the frictional transmission mechanism) therein. FIG. 3 is a view taken along the arrowed line III—III of FIG. 2, and FIG. 4 is a view taken along the arrowed line IV—IV of FIG. 1. FIG. 5 is a view similar to FIG. 4, showing an example for another reduction ratio.

Figure 18:
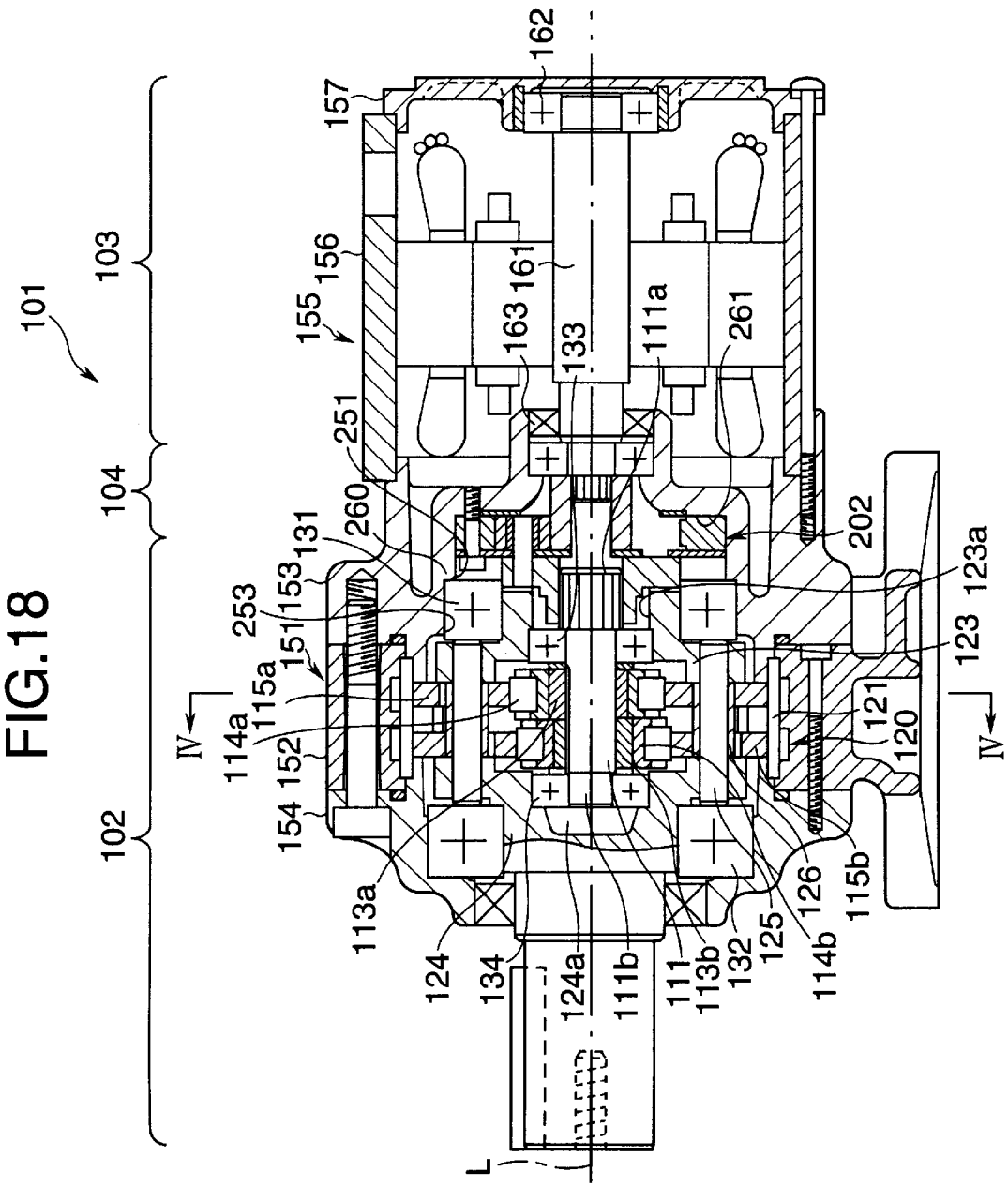
FIG. 18 is a sectional view of a geared motor shown as another embodiment of the present invention.

Incidentally, in the following descriptions, like or similar parts to those of the conventionally known arrangement shown in FIG. 18 will be designated by like reference numerals having the same lower two digits, and obviously repetitive descriptions thereto will be omitted.

This geared motor 101 has a reduction gear unit (the oscillating internal meshing planetary gear unit, the oscillating internal meshing planetary gear mechanism, and the second reduction mechanism unit described above) 102 and a motor unit (the external unit, the drive unit) 103 connected and integrated with each other. The reduction gear unit 102 contains an oscillating internal meshing planetary gear structure. A frictional transmission unit (the frictional transmission mechanism, the first reduction mechanism unit) 104 is interposed between the reduction gear unit 102 and the motor unit 103. This frictional transmission unit 104 comprises a single planetary roller mechanism 202 for transmitting rotational power between the units 102 and 103 by means of the friction among a plurality of rollers (the friction rollers) contacting one another.

The reduction gear unit 102 has a casing 151 which is composed of a central casing 152 disposed at the axial center, a joint casing 153 on the side closer to the motor unit 103, and a front casing 154 on the side opposite from the motor unit 103. The motor unit 103 has a casing 155 which is composed of a cylindrical casing 156 having a stator formed inside, the joint casing 153 on the side closer to the reduction gear unit 102, and a rear cover 157 on the side opposite from the reduction gear unit 102.

Here, the joint casing 153 comprises both parts of the casings 151 and 155 of the reduction gear unit 2 and the motor unit 3. Through the intervention of this joint casing 153, the reduction gear unit 102 and the motor unit 103 are integrally connected with each other. Then, the simple planetary roller mechanism 202 serving as the frictional transmission unit 104 is arranged inside the joint casing 153.

Here, the simple planetary roller mechanism 202 corresponds to the preceding-stage reduction part. The oscillating internal meshing planetary gear structure serving as the reduction gear unit 102 corresponds to the subsequent-stage reduction part.

The reduction gear unit 102 has a first shaft 111 serving as the input shaft (the high-speed shaft) and a second shaft 112 serving as the output shaft (the low-speed shaft) both on the center axis L of the unit.

Two eccentric bodies 113a and 113b are fitted on the outer periphery of the first shaft 111 so as to axially adjoin each other with a given phase difference therebetween (180°, in this embodiment). These eccentric bodies 113a and 113b make rotations together with the first shaft 111. As shown in FIG. 4, the respective centers O1 of the eccentric bodies 113a and 113b are off the center O2 of the first shaft 111 with a given eccentricity e. External gears 115a and 115b are fitted on the outer peripheries of the eccentric bodies 113a and 113b via bearings 114a and 114b, respectively.

The plural rows of external gears 115a and 115b fitted onto the eccentric bodies 113a and 113b have a plurality of inner pin holes 116a and 116b, respectively. Inner pins 117 are fitted into these inner pin holes 116a and 116b with some play.

On the outer peripheries of the external gears 115a and 115b are provided outward teeth each having a trochoidal tooth profile or a circular arc tooth profile. These outward teeth come into internal mesh with an internal gear 120 which is provided concentrically with the first shaft 111. The internal gear 120 is integrally formed on the inner periphery of the central casing 152. Each inward tooth of the internal gear 120 is formed with an outer pin 121 retained on the inner periphery of the central casing 152.

The difference in the number of teeth between each external gear 115a, 115b and the internal gear 120 is "4" in the example of FIG. 4, and "1" in the example of FIG. 5.

The two external gears 115a and 115b are interposed between a pair of support carriers (the support carriers) 123 and 124. The support carriers 123 and 124 are rotatably supported by bearings 131 and 132 fitted to the inner peripheries of the joint casing 153 and the front casing 154, respectively. The support carriers 123 and 124 are also integrally connected with each other by a plurality of carrier pins (coupling pins) 125 and spacers 126 piercing through the external gears 115a and 115b.

The inner pins 117, fitted to the inner pin holes 116a and 116b in the external gears 115a and 115b with some play, are supported at both ends by the pair of carriers 123 and 124 on both sides so as to be capable of sliding rotations. This allows only the rotational components of the external gears 115a and 115b to be transmitted to the carriers 123 and 124 through the inner pins 117.

The support carrier 123 closer to the motor unit 103 is of annular shape having a center hole 123a. One end (a spline shaft portion, to be described later) 111a of the first shaft 111 lies inside the center hole 123a.

The other carrier 124 is integrally formed on the base of the second shaft 112, and provided with a recess 124a into which the other end 111b of the first shaft 111 is inserted. The first shaft 111 is rotatably supported by bearings 133 and 134. The bearing 133 is fitted to the inner periphery of the through hole 123a in the carrier 123, and the bearing 134 is fitted to the inner periphery of the other carrier 124.

The motor shaft (the drive shaft, the rotating shaft) 161 of the motor unit 103 is supported at its rear end by a bearing 162 and at its front end by a bearing 163. The bearings 162 and 163 are fitted to the rear cover 157 and the joint casing 153, respectively. The motor shaft 161 is arranged to be coaxial with the center axis L of the reduction gear unit 102.

Figure 22:
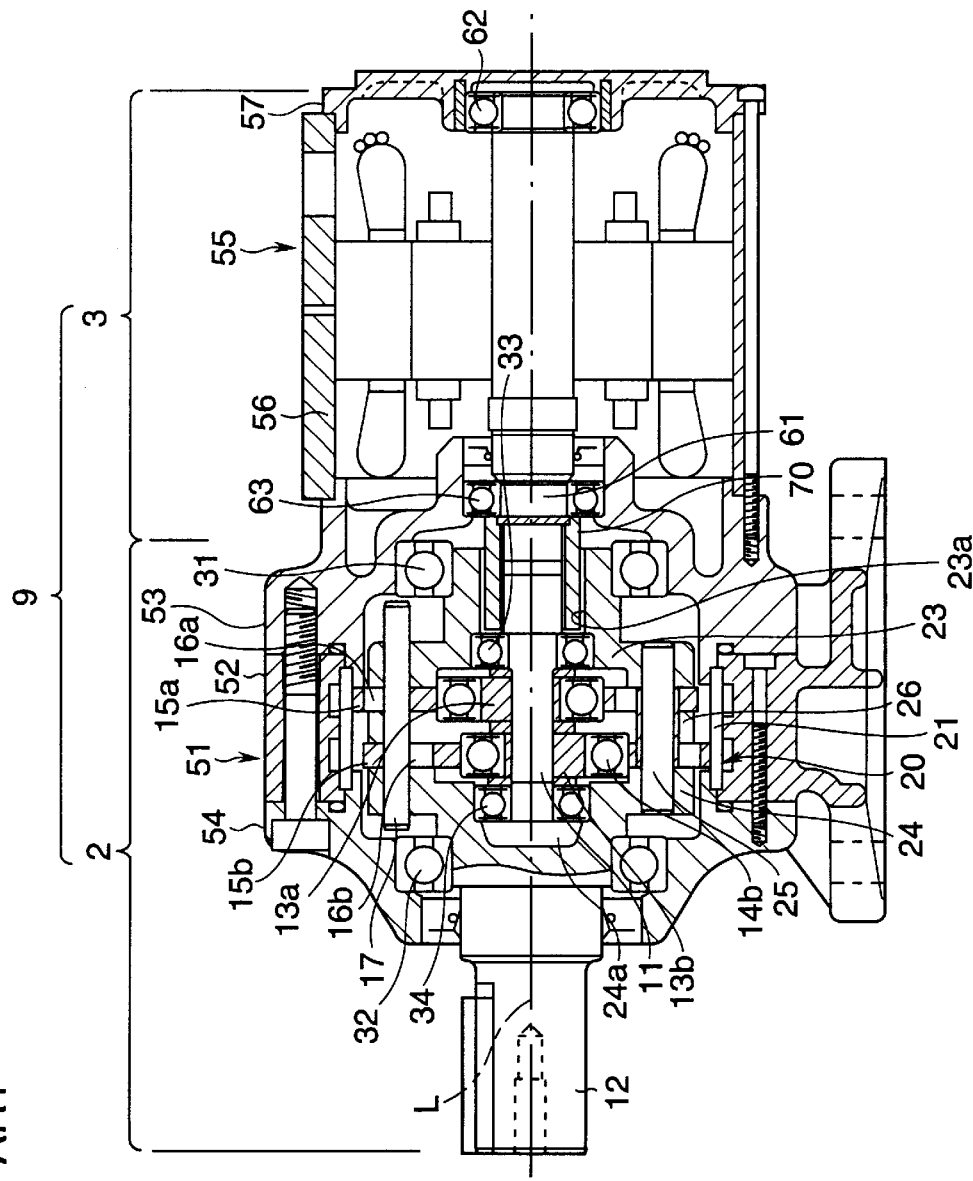
FIG. 22 is a sectional view of a conventional geared motor.

The geared motor 101 so far has almost the same constitution as that of the conventional geared motor 1 of FIG. 22.

A difference consists in that a new space is secured next to the bearing 131 supporting the support carrier 123 closer to the motor unit 103, and the simple planetary roller mechanism 202 is built into the space as the above-mentioned frictional transmission unit 104.

To contain this simple planetary roller mechanism 202, the joint casing 153 is somewhat extended in axial dimension. The joint casing 153 also has a deeply-bored recess portion 251 formed in its inner periphery from the side closer to the reduction gear unit 102. The simple planetary roller mechanism 202 is mounted on the bottom, or the side closer to the motor unit 103, of the recess portion 251.

As shown in FIGS. 2 and 3, the simple planetary roller mechanism 202 has the friction rollers consisting of a sun roller 211, a plurality (four, in this embodiment) of planetary rollers 212, and a ring roller 213. The sun roller 211 has a spline shaft portion 214. The planetary rollers 212 are of hollow cylindrical shape, and make rolling contact with the outer periphery of the sun roller 211. The ring roller 213 has an inside diameter D3 somewhat smaller than the sum of the diameter D1 of the sun roller 211 and the value twice the diameter D2 of the above-mentioned planetary rollers 212. The ring roller 213 has the planetary rollers 212 arranged inside so as to make internal contact.

In this case, the ring roller 213 is fixed to the joint casing 153 by through bolts 252 to make the fixed element of the simple planetary roller mechanism 202. The sun roller 211 makes the input element, and a planetary carrier 215 supporting the planetary rollers 212 makes the output element.

The planetary carrier 215 for extracting the revolutions of the planetary rollers 212 has an output shaft portion 216 of hollow cylindrical shape, projected toward the reduction gear unit 102, and a retainer portion (the retainer) 217 of generally annular shape. An inner spline 218 is formed in the inner periphery of the output shaft portion 216.

Four circular recesses 219 each having an open end on the side opposite from the output shaft portion 216 are formed in the retainer portion 217 of the planetary carrier 215 at regular intervals along the circumferential direction. Each of the recesses 219 accommodates one of the planetary rollers 212 rotatably. Each of the circular recesses 219 has a peripheral surface that is partially open to both the outer and inner sides of the retainer portion 217. Each of the planetary rollers 212 exposes a part of its peripheral surface from the outer-side opening 219a to make contact with the inner periphery of the ring roller 213. Each of the planetary rollers 212 also exposes a part of its peripheral surface from the inner-side opening 219b to make contact with the outer periphery of the sun roller 211.

This retainer portion 217 occupies the spaces around the plurality of planetary rollers 212 to retain the planetary rollers 212 at constant mutual positions. Thus, the planetary carrier 215 provided with this retainer portion 217 functions to rotatably retain the planetary rollers 212 and to extract the revolution components of the planetary rollers 212.

Arranged on both end faces of the ring roller 213 are side plates 221 of annular shape. By these side plates, the contact surface of the ring roller 213 with the planetary rollers 212 is shielded from outside all over the circumference. This shielded space is also sealed from inside by the outer peripheries of the retailer portion 217 so that traction grease priced higher than gear grease is enclosed in the shielded space. The role of the traction grease is to ensure frictional forces, not to reduce friction.

In addition, a partition plate 222 is arranged at the end of the sun roller 211 to separate the space accommodating the sun roller 211 from the internal space of the output shaft portion 216.

This simple planetary roller mechanism 202 is assembled, for example, in a manner as follows:

Initially, the planetary rollers 212 are mounted on the retainer portion 217 of the planetary carrier 215. Then, the planetary rollers 212 as-mounted are put into external contact with the outer periphery of the sun roller 211. In that state, the ring roller 213 is heated to expand, and the planetary rollers 212 retained by the planetary carrier 215 are inserted into the bore of the ring roller 213. This subsequently cools to complete the simple planetary roller mechanism 202 in which the ring roller 213 and the planetary rollers 212, as well as the planetary rollers 212 and the sun roller 211, are in contact with each other at a given contact pressure.

The simple planetary roller mechanism 202 as-preassembled is then accommodated into the bottom of the recess portion 251 formed in the joint casing 153, with the output shaft portion 215 of the planetary carrier 215 directed toward the reduction gear unit 102 and the spline shaft portion 214 of the sun roller 211 directed toward the motor unit 103. Then, the through bolts 252 inserted through the ring roller 213 are screwed into the bottom wall of the recess portion 251 to fix the simple planetary roller mechanism 202 to the joint casing 153. Incidentally, this point will be detailed later.

In this state, the output shaft portion 216 on the planetary carrier 215 of the simple planetary roller mechanism 202 is inserted into the center hole 123a which is formed in the support carrier 123 closer to the motor unit 103, of the reduction gear unit 102.

The bearing 131 supporting the support carrier 123 of the reduction gear unit 102 is fitted to the mouth of the recess portion 251. This bearing 131 is axially positioned by a spacer 253 lying between the bearing 131 and the simple planetary roller mechanism 202.

Thus, the simple planetary roller mechanism 202 is interposed between the reduction gear unit 102 and the motor unit 103. The sun roller 211 of the simple planetary roller mechanism 202 and the motor shaft 161 of the motor unit 103 are connected with each other via a coupling 170. The output shaft portion 216 on the planetary carrier 215 of the simple planetary roller mechanism 202 and the first shaft 111 of the reduction gear unit 102 are coupled with each other by inserting the extremity (spline shaft portion) 111a of the first shaft 111 into the bore of the output shaft portion 216.

Here, through the intervention of the coupling 170 equipped with an inner spline 170*a,* a spline shaft portion 161*a* on the extremity of the motor shaft 161 and the spline shaft portion 214 of the sun roller 211 come into floating connection with each other while allowing radial play therebetween. In addition, the spline shaft portion 111*a* on the extremity of the first shaft 111 is inserted to the output shaft portion 216 equipped with the inner spline 218, so that the output shaft portion 216 of the planetary carrier 215 and the first shaft 111 come into floating connection with each other while allowing radial play therebetween.

Due to the partition plate 222 arranged inside the planetary carrier 215 of the simple planetary roller mechanism 202, the internal space of the output shaft portion 216 is sealed off at the contact are a with the end face of the sun roller 211. This allows the simple planetary roller mechanism 202 to be filled with grease that is effective for frictional transmission, in distinction from the lubricating oil for the reduction gear unit 102.

Next, description will be given of the operation of the geared motor 101.

When the motor shaft 161 is rotated, the rotation is transmitted to the sun roller 211 of the simple planetary roller mechanism 202 to urge the rotation of the planetary rollers 212. Here, the planetary rollers 212 are in contact with the fixed ring roller 213. Therefore, the planetary rollers 212 make rotations and revolutions along the inner periphery of the ring roller 213, and the revolution components are input to the first shaft 111 of the reduction gear unit 102 via the planetary carrier 215.

Then, as in the conventional examples, the external gears 115*a* and 115*b* make oscillations while making internal contact with the internal gear 120. As a result, the rotational components in the oscillations of the external gears 115*a* and 115*b* are extracted to the second shaft 112 via the support carriers 123 and 124.

During the power transmission described above, the reduction gear unit 102 and the motor unit 103 independently produce specific vibrations. However, the coupling portions of the reduction gear unit 102 with the units 102 and 103 on both sides, namely, the coupling portion between the planetary carrier 215 and the first shaft 111 and the coupling portion between the sun roller 211 and the motor shaft 161 are provided with the spline mechanisms (the floating connection structures) for allowing radial play. These portions first absorb vibrations (radial vibrations, especially) participating the transmission between the reduction gear unit 102 and the motor unit 103 on both sides.

Between the units 102 and 103 are interposed the simple planetary roller mechanism 202 as the frictional transmission unit 104. Therefore, those vibrations (circumferential vibrations and axial vibrations, especially) participating the transmission between the reduction gear unit 102 and the motor unit 103 on both sides are then absorbed by the contact surfaces within the simple planetary roller mechanism 202, namely, the contact surfaces between the sun roller 211 and the planetary rollers 212, the contact surfaces between the planetary rollers 212 and the ring roller 213, and even the contact surfaces between the planetary rollers 212 and the planetary carrier 215. This ensures the interception of the vibration transmission between the units 102 and 103 on both sides.

As a result, the complex resonance phenomena resulting from the vibration transmission between the reduction gear unit 102 and the motor unit 103 are avoided to reduce the levels of the vibrations and noises produced by the entire geared motor 101.

In other words, the simple planetary roller mechanism 202 (104) is deliberately interposed between the reduction gear unit 102 and the motor unit 103 as a third unit. Due to this, the vibration transmission from the reduction gear unit 102 to the motor unit 103 and the vibration transmission from the motor unit 103 to the reduction gear unit 102 can be effectively suppressed to reduce the vibrations and noises of the entire geared motor 101 consequently.

The reduction of vibration gives greater durability to the component parts of the motor unit 103, as well as the component parts of the reduction gear unit 102 such as the external gears 115*a,* 115*b,* the eccentric bodies 113*a,* 113*b,* and the internal gear 120.

As described previously, the shaft coupling portions of the simple planetary roller mechanism 202 (104) with the reduction gear unit 102 and the motor unit 103 on both sides are provided with the floating connection structures for allowing radial play. This makes it possible to prevent the planetary rollers 212 and the sun roller 211 being subjected to radial external forces (and vibrations) from the units 102 and 103 on both sides.

Accordingly, fluctuations in contact pressure at the contact surfaces between the planetary rollers 212 and the sun roller 211 and at the contact surfaces between the planetary rollers 212 and the ring roller 213 can be suppressed. This in turn suppresses torque transmission fluctuations in the simple planetary roller mechanism 202, thereby allowing stable, sure torque transmission.

The reduction gear unit 102 used in this geared motor 101 has both the first and second shafts 111 and 112 aligned on its center axis L. Therefore, this reduction gear unit 102 of its simple, compact structure has a merit that its rigidity can be increased to realize higher torque transmission by that much.

For example, the first shaft 111, which undergoes the maximum influence from the loads of the external gears 115*a* and 115*b,* can be set at higher rigidity to ease the problem of flexure-originated vibrations.

Now, unlike the conventional power-distributed shaft type technology described above, the planetary rollers 212 are supported by the planetary carrier 215 which is isolated from the vibration-generating first shaft 111. Accordingly, even in the cases where vibrations or deformations arise on the first shaft 111, their influences are kept from reaching the roller contact surfaces of the simple planetary roller mechanism 202. Thus, the simple planetary roller mechanism 202 can also realize sure, stable torque transmission through these contact surfaces.

In the geared motor 101 described above, the newly-added simple planetary roller mechanism 202 is built into the joint casing 153 for connecting the reduction gear unit 102 and the motor unit 103. This allows the improvement to be made without a great change in the structures of the reduction gear unit 102 and the motor unit 103 on both sides.

In particular, the simple planetary roller mechanism 202 has both its input part (the sun roller 211) and output part (the output shaft portion 216 of the planetary carrier 215) on the same axis. Hence, the geared motor 101 of this embodiment can be produced with only a slight change to the conventional geared motor 1 of FIG. 22. This point will also be detailed later.

The simple planetary roller mechanism 202 is capable of speed reduction by itself. Therefore, the geared motor 101 which combine the simple planetary roller mechanism 202 at the preceding stage and the reduction gear unit 102 of oscillating internal meshing planetary gear structure type at the subsequent stage can achieve higher total reduction ratios. Moreover, unlike gears, the simple planetary roller mechanism 202 is easy to set the reduction ratio finely. This allows easy provision of a series of geared motors with many steps of reduction ratios, or a geared motor having a particular reduction ratio corresponding to a specific application.

For example, it is possible to prepare a number of reduction gear units 102 of oscillating internal meshing planetary gear structure type for geometrically progressive reduction ratios. These reduction gear units 102 can be combined with the first-stage reduction of the simple planetary roller mechanism 202 to realize geometrically-progressive total reduction ratios in a number of steps.

The preceding-stage torque transmission by means of the frictional transmission can ensure only a small amount of transmission torque. This, however, does not matter for the reasons that the amount of torque to transmit at the preceding-stage reduction is rather small in the first place, and that the preceding stage realizes stable rotations as blocked from vibrations.

The embodiment described above has dealt with the case where the frictional transmission unit 104 is interposed between the reduction gear unit, or the oscillating internal meshing planetary gear unit, 102 and the motor unit 103. However, the frictional transmission unit can also be interposed between the oscillating internal meshing planetary gear unit and any other external unit to promise the same resonance-preventing effect as that mentioned above.

For example, in the case where the second shaft 112 and an external unit coupled thereto may produce resonance, a frictional transmission unit is recommended to be interposed between the second shaft and the input shaft of the external unit.

When the oscillating internal meshing planetary gear unit is used as step-up gears, its second shaft makes the input shaft, and its first shaft the output shaft; therefore, the second shaft is connected to the motor unit, and the first shaft is to the external unit. Even in this case, the frictional transmission unit is appropriately interposed between units that may produce resonance.

The embodiment described above has also dealt with the case where the planetary carrier 215 for retaining the planetary rollers 212 is provided with the retainer portion 217, and this retainer portion 217 retains the plurality of planetary rollers 212 at constant mutual positions. However, the frictional transmission unit may employ a simple planetary roller mechanism that retains the planetary rollers by means of pins.

Figure 6:
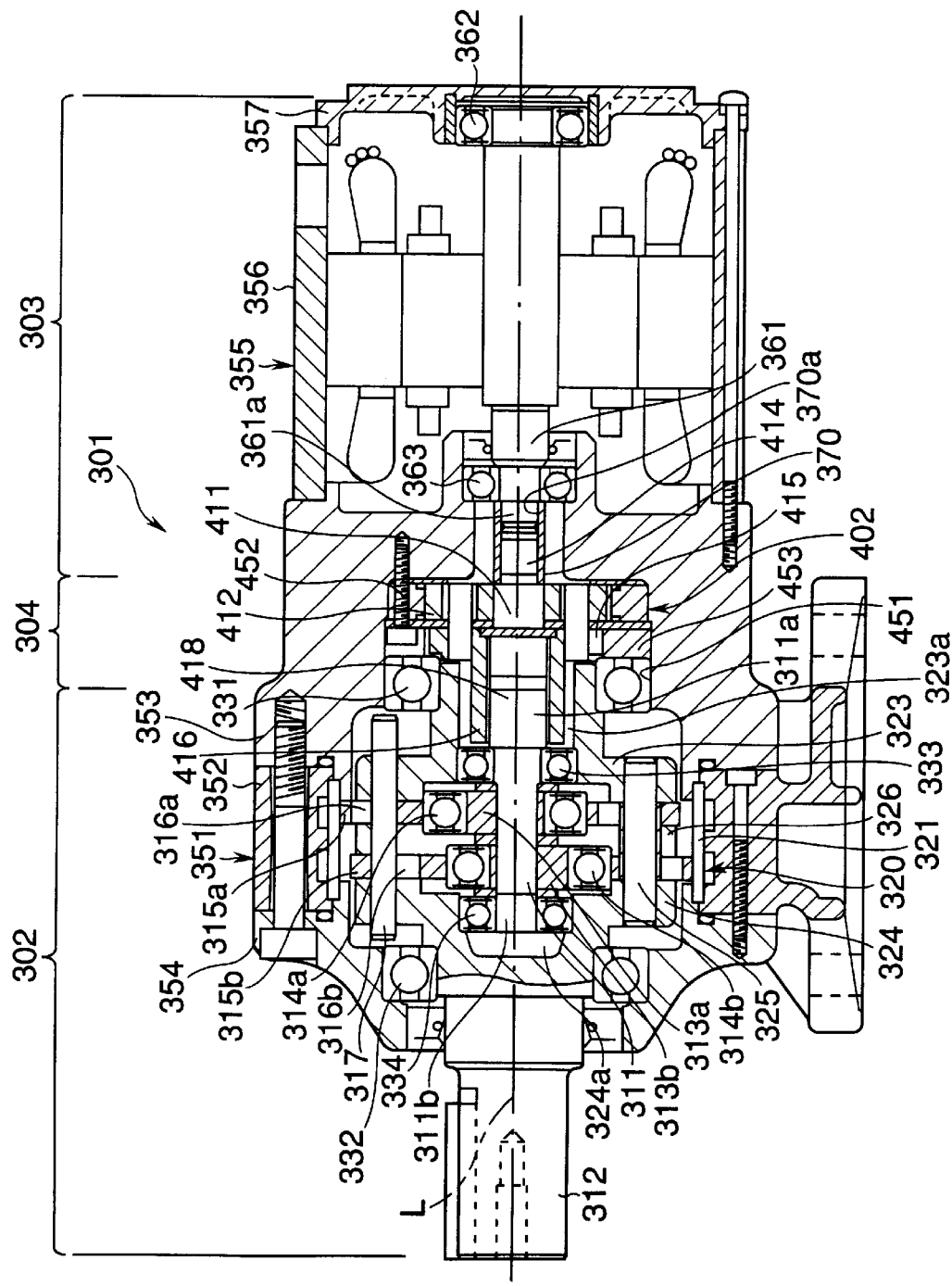
FIG. 6 is a sectional view of a geared motor shown as another embodiment of the present invention.
Figure 7:
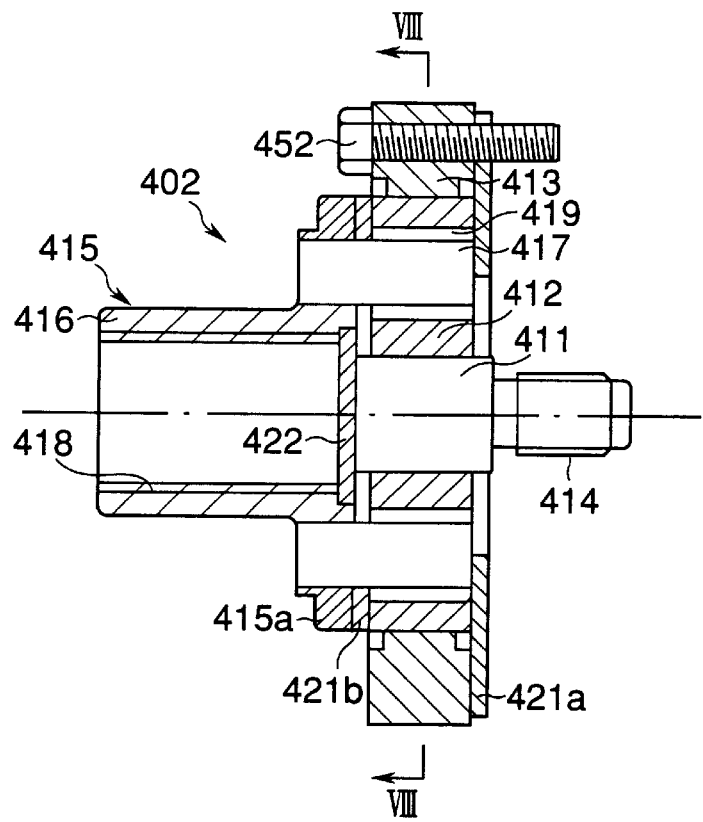
FIG. 7 is a sectional view of the frictional transmission unit (the simple planetary roller mechanism) in the geared motor.
Figure 8:
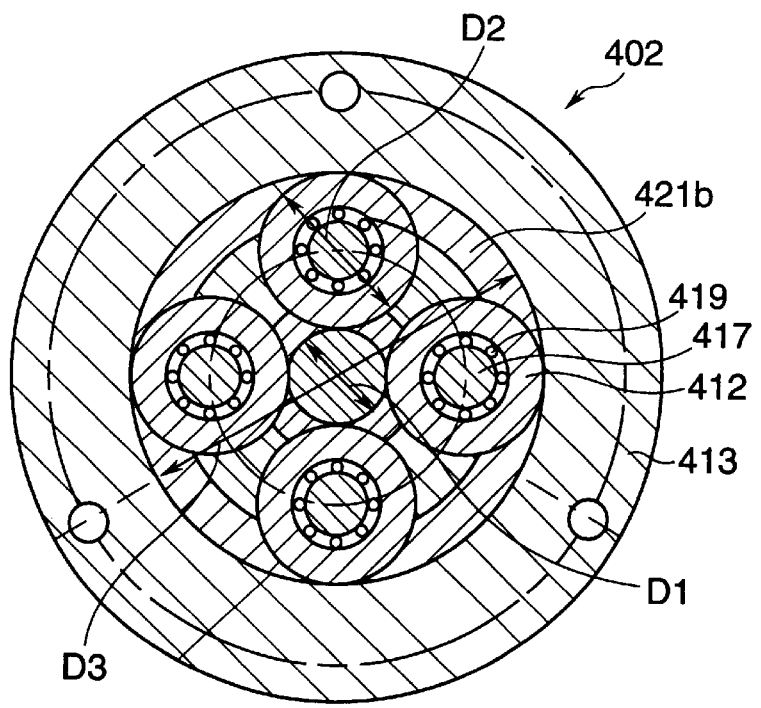
FIG. 8 is a view taken along the arrowed line VIII—VIII of FIG. 7.

FIG. 6 shows a geared motor 301 which adopts a pin-typed simple planetary roller mechanism 402 for its frictional transmission unit 304. FIG. 7 is an enlarged sectional view of the simple planetary roller mechanism 402, and FIG. 8 is a view taken along the arrowed line VIII—VIII of FIG. 7. Incidentally, this geared motor 301 has almost the same constitution as that of the geared motor 101 shown in FIGS. 1–5, with only the slight difference in the type of the simple planetary roller mechanism 402 from that of FIGS. 1–5. Accordingly, in the following descriptions, like parts to those shown in FIGS. 1–5 will be designated by reference numerals having the same lower two digits, and repetitive descriptions thereto will be omitted. Here, those one-hundreds numerals in FIGS. 1–5 will be represented in three-hundreds, and those two-hundreds in four-hundreds.

As shown in FIGS. 7 and 8, the simple planetary roller mechanism 402 of this geared motor 301 has friction rollers consisting of a sun roller 411, a plurality (four, in this embodiment) of planetary rollers 412, and a ring roller 413. The sun roller 411 has a spline shaft portion 414. The planetary rollers 412 are of hollow cylindrical shape, and make rolling contact with the outer periphery of the sun roller 411. The ring roller 413 has an inside diameter D3 somewhat smaller than the sum of the diameter D1 of the sun roller 411 and the value twice the diameter D2 of the above-mentioned planetary rollers 412. The ring roller 413 has the planetary rollers 412 arranged inside so as to make internal contact.

As shown in FIG. 6, the ring roller 413 is again fixed to the joint casing 353 by through bolts 452, making the fixed element of the simple planetary roller mechanism 402. The sun roller 411 makes the input element, and a planetary carrier 415 supporting the planetary rollers 412 makes the output element.

The planetary carrier 415 for extracting the revolutions of the planetary rollers 412 has an output shaft portion 416 of hollow cylindrical shape, projected toward the reduction gear unit 302 from an annular flange portion 415a. The planetary carrier 415 is also provided with four pins 417 which are fitted and fixed to the flange portion 415a at their bases and projected toward the motor unit 303 at their extremities. An inner spline 418 is formed in the inner periphery of the output shaft portion 416.

The respective planetary rollers 412 are rotatably fitted on the outer peripheries of the pins 417 via needle bearings 419 so that the planetary rollers 412 are retained at constant mutual positions. In that state, the respective planetary rollers 412 come into contact with the inner periphery of the ring roller 413 at their outer sides, and with the outer periphery of the sun roller 411 at their inner sides. Thus, the planetary carrier equipped with the pins 417 functions to rotatably retain the intervals among the planetary rollers 412 and to extract the revolution components of the planetary rollers 412.

In addition, spacers 421a and 421b of annular shape are arranged on both end faces of the ring roller 413. A partition plate 422 is arranged at the end of the sun roller 411 to separate the space accommodating the sun roller 411 from the internal space of the output shaft portion 416.

This simple planetary roller mechanism 402 is assembled, for example, in a manner as follows:

Initially, the planetary rollers 412 are mounted on the outer peripheries of the pins 417 of the planetary carrier 415 via the needle bearings 419. Then, the planetary rollers 412 as-mounted are put into external contact with the outer periphery of the sun roller 411. In that state, the ring roller 413 is heated to expand, and the planetary rollers 412 retained by the planetary carrier 415 are inserted into the bore of the ring roller 413. This subsequently cools to complete the simple planetary roller mechanism 402 in which the ring roller 413 and the planetary roller 412, as well as the planetary rollers 412 and the sun roller 411, are in contact with each other at a given contact pressure.

Incidentally, the examples of FIGS. 18–20 to be described later also have a simple planetary roller mechanism of pin type.

[Noise Measurement Test]

Turning to the data for objective representation of the present invention's effectiveness, description will be given of the results of the noise measurement test made on the above two embodiments of the present invention, i.e., the geared motors 101 and 301. Here, the same measurement test was also made on several other geared motors for the purpose of comparison.

Subjected to the measurement test were six types of geared motors, each having a motor and two stages of reduction units. Specifically, each apparatus was coupled to a motor as the external unit. Six types of first-stage reduction units were prepared including the comparative examples. Every second-stage reduction unit was an oscillating internal meshing planetary gear structure.

Here, description will be directed to the constitutions of the geared motors prepared as the samples (a) to (f). For the sake of simplicity, the combinations of the mechanism parts in the respective types of geared motors are shown by symbols in FIG. 9.

The following list shows the meanings of the respective symbols employed here:

M . . . Motor;

C . . . Oscillating Internal meshing planetary gear type;

F . . . Power-distributed shaft type;

P . . . Simple planetary type;

G . . . Gear type; and

T/D . . . Frictional transmission type by means of rollers.

More particularly:

C1 . . . Reduction stage of oscillating internal meshing planetary gear type (at the subsequent stage=the second stage);

C2 . . . Reduction stage of oscillating internal meshing planetary gear type (at the preceding stage=the first stage);

F(G) . . . Power-distributed-shaft type reduction stage of gearing system;

F(T/D) . . . Power-distributed-shaft type reduction stage of frictional transmission roller system;

P(G) . . . Planetary type reduction stage of gearing system;

P(T/D) . . . Planetary type reduction stage of frictional transmission roller system;

A . . . Type to retain rollers by retainer; and

B . . . Type to retain rollers by pins.

[Types of Geared Motors Used in Test]

The geared motors of the samples (a) to (f) are represented by symbols as follows:

Sample (a) . . . "C1+C2+M";

Sample (b) . . . "C+F(G)+M";

Sample (c) . . . "C1+F(T/D)+M";

Sample (d) . . . "C1+P(G)+M";

Sample (e) . . . "C1+P(T/D)A+M"; and

Sample (f) . . . "C1+P(T/D)B+M."

Of these, the samples (a) to (d) are the geared motors prepared as the comparative examples, and the samples (e) and (f) are the geared motors of the embodiments of the present invention.

Figure 25:
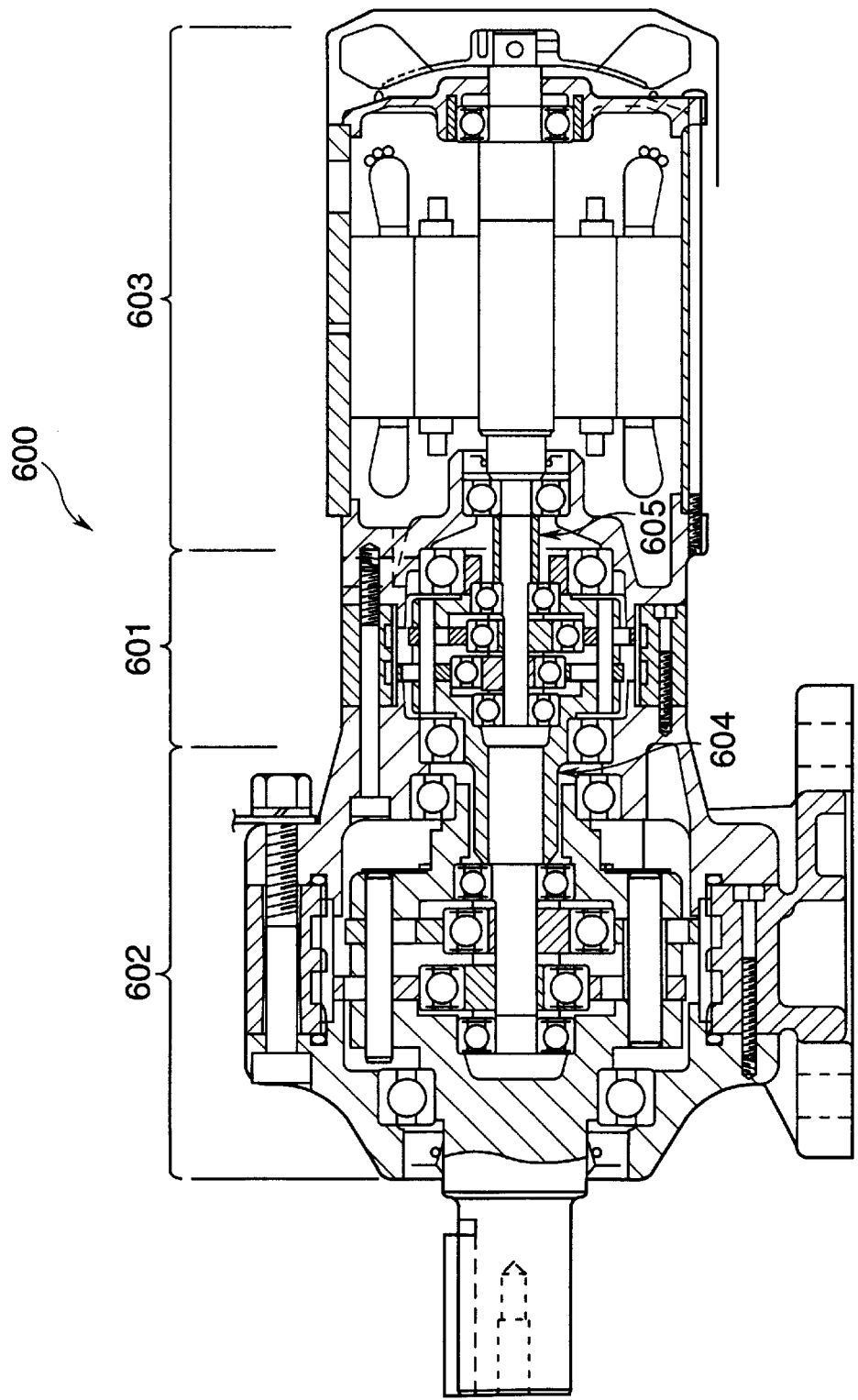
FIG. 25 is a sectional view of a geared motor for use in the noise measurement as a comparative example.

The geared motor according to the sample (a), or "C1+C2+M," takes the form of a geared motor 600 shown in FIG. 25. This geared motor 600 has an oscillating internal meshing planetary gear mechanism 601 (C2) as the first-stage reduction unit and an oscillating internal meshing planetary gear mechanism 602 (C1) at the second-stage reduction unit. The input shaft of the first-stage oscillating internal meshing gear mechanism 601 is put into floating connection with the shaft of the motor 603 (M) via a spline 605. The output shaft of the first-stage oscillating internal meshing planetary gear mechanism 601 is put into floating connection with the input shaft of the second-stage oscillating internal meshing planetary gear mechanism 602 via a spline 604.

Figure 26:
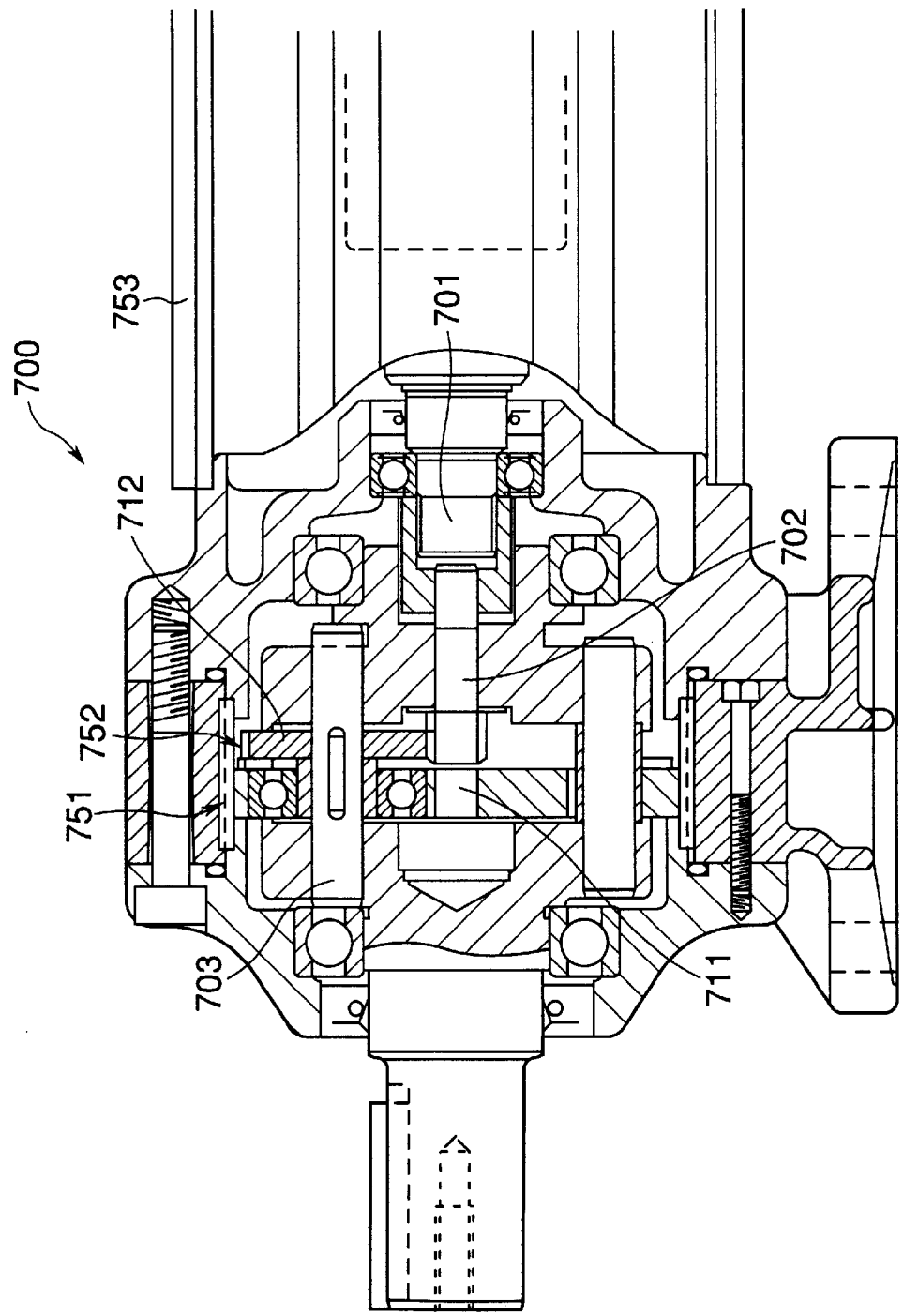
FIG. 26 is a sectional view of another geared motor for use in the noise measurement as a comparative example.

The geared motor according to the sample (b), or "C1+F(G)+M," takes the form of a geared motor 700 shown in FIG. 26. This geared motor 700 is formed by replacing "the fiction rollers (the sun roller 511 and the power-distributed rollers 512)" of FIG. 23 with "gears (a sun gear 711 and power-distributed gears 712)." In other words, the geared motor 700 is constituted so that its oscillating internal meshing planetary gear mechanism 751 (C1) of power-distributed shaft type is supplied with input rotations from a gear transmission mechanism 752 [F(G)] comprised of the sun gear 711 and the power-distributed gears 712. The input shaft 702 having the sun gear 711 on its extremity is put into spline connection with the shaft 701 of the motor 753 (M).

Figure 23:
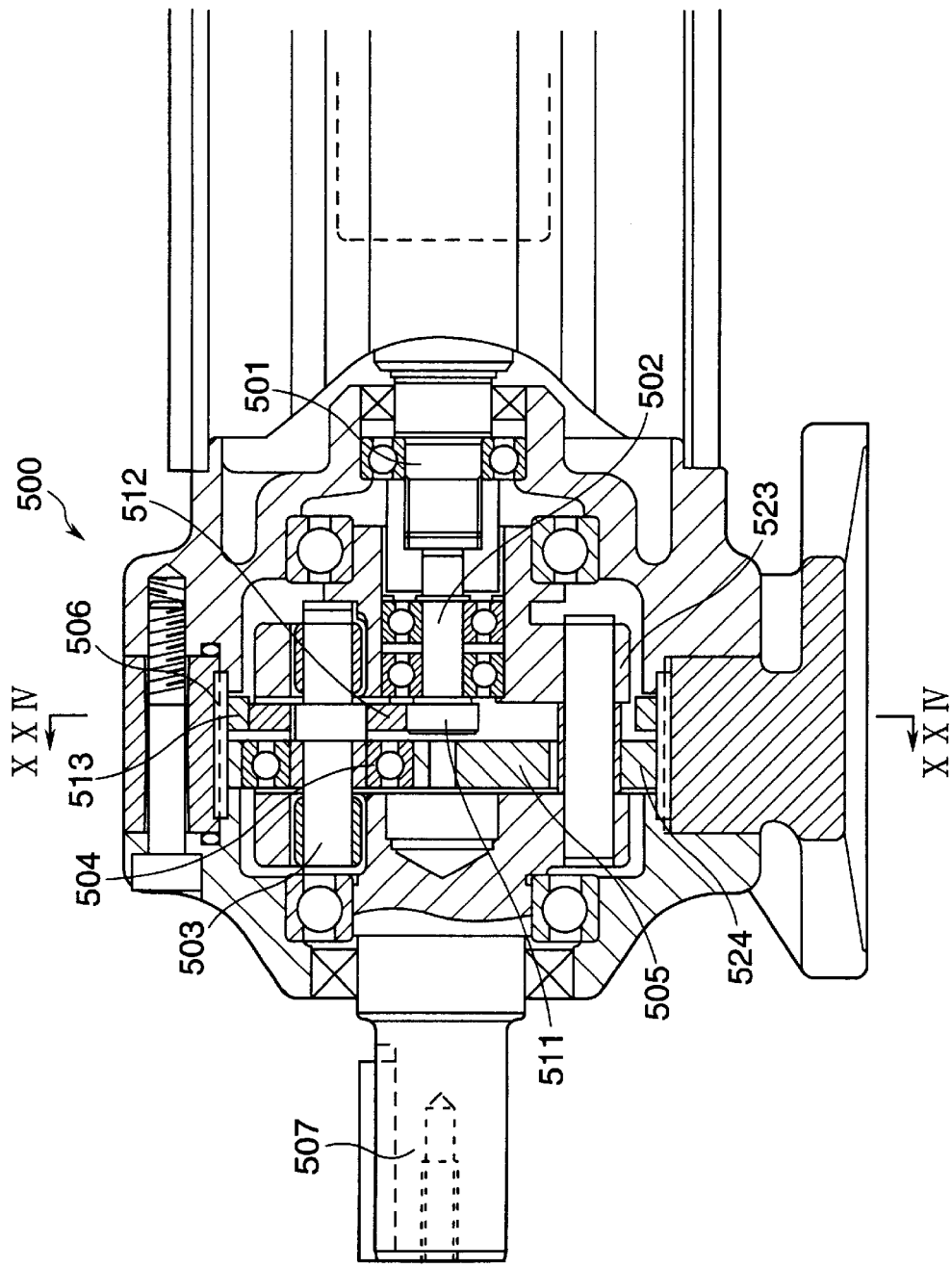
FIG. 23 is a sectional view of a conventional, power-distributed-shaft-typed oscillating internal meshing planetary gear structure.
Figure 24:
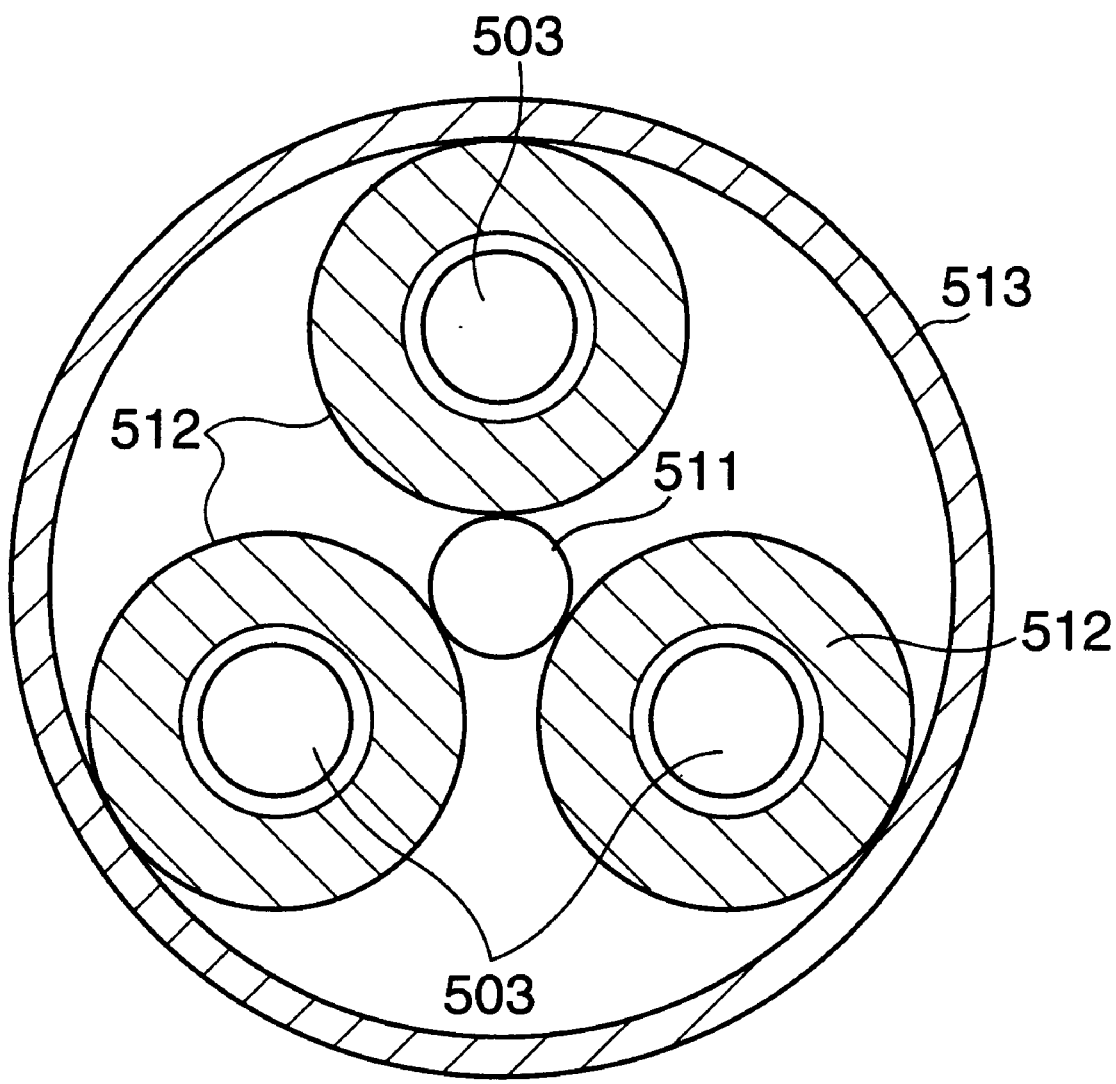
FIG. 24 is a schematic sectional view taken along the arrowed line XXIV—XXIV of FIG. 23.

The geared motor according to the sample (c), or "C1+F(T/D)+M," is the conventional geared motor 500 shown in FIG. 23. In this geared motor 500, the power-distributed shafts is supplied with input rotations from the transmission mechanism of friction roller type [F(T/D)].

Figure 27:
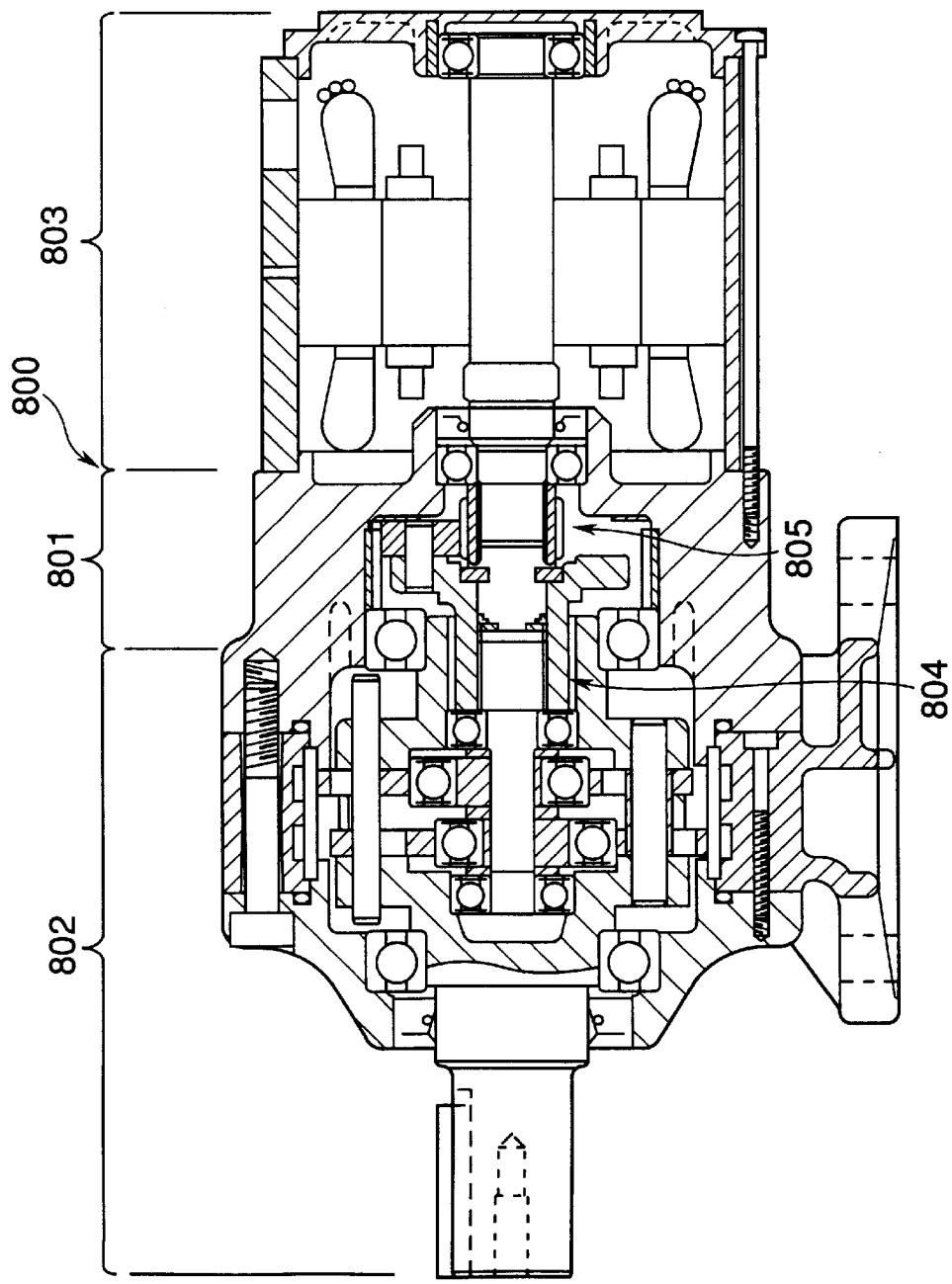
FIG. 27 is a sectional view of yet another geared motor for use in the noise measurement as a comparative example.
Figure 28:
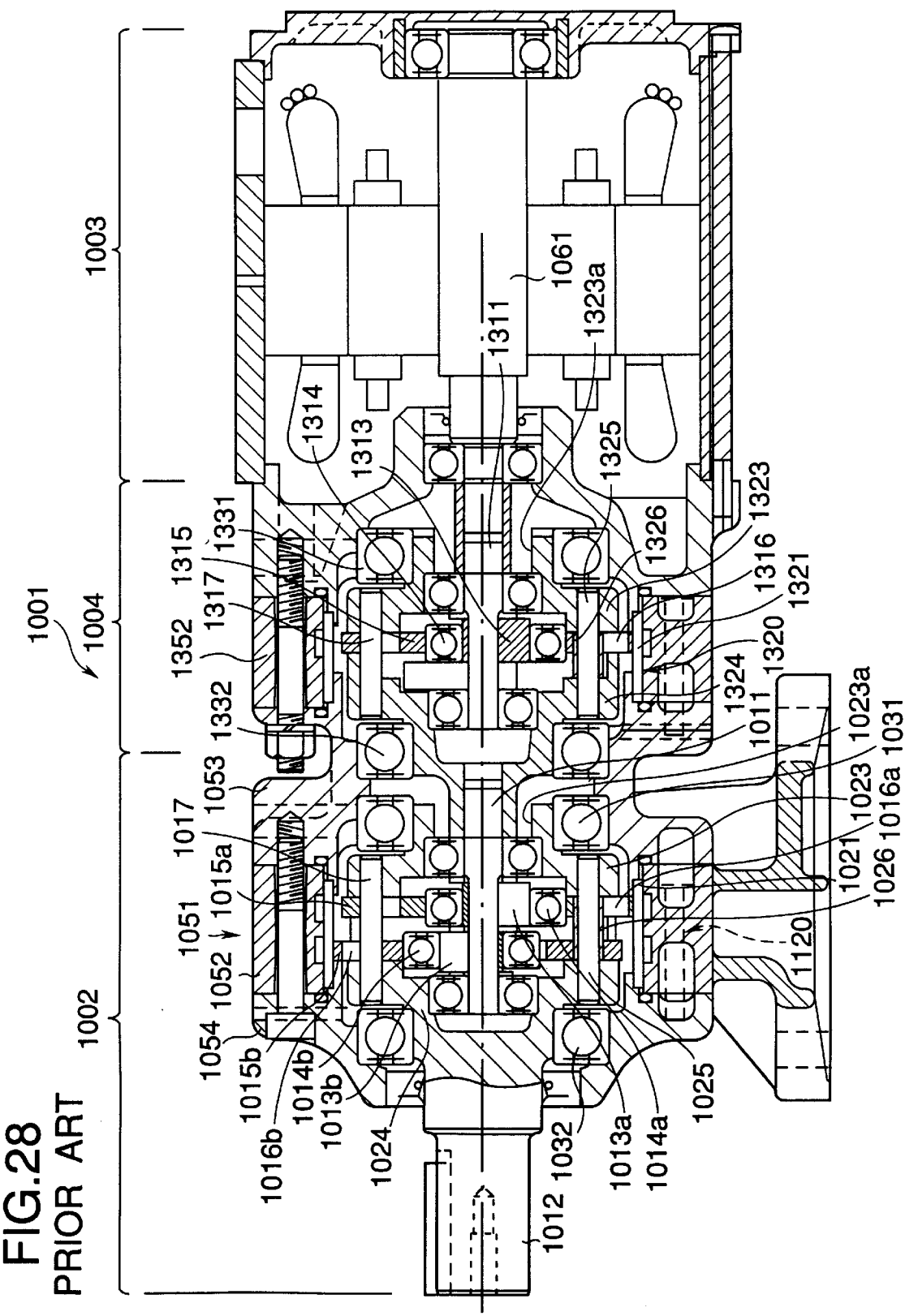
FIG. 28 is a sectional view of a conventional driving apparatus.

The geared motor according to the sample (d), or "C1+P(G)+M," takes the form of a geared motor 800 shown in FIG. 27. This geared motor 800 has a planetary gear mechanism 801 [P(G)] as the first-stage reduction unit and an oscillating internal meshing planetary gear mechanism 802 (C1) as the second-stage reduction unit. Floating connection structures are established in both the coupling portion 805 between the input shaft of the planetary gear mechanism 801 and the output shaft of the motor 803 (M) and the coupling portion 804 between the output shaft of the planetary gear mechanism 801 and the input shaft of the oscillating internal meshing planetary gear mechanism 802.

The geared motor of the sample (e), or "C1+P(T/D)A+M," is the geared motor 101 shown in FIG. 1, according to the first embodiment of the present invention. This geared motor 101 has the simple planetary roller mechanism 202 as the frictional transmission unit 201, and retains the planetary rollers 212 by the retainer arranged on the planetary carrier 215.

The geared motor of the sample (f), or "C1+(T/D)B+M," is the geared motor 301 shown in FIG. 6, according to the second embodiment of the present invention. This geared motor 301 has the simple planetary roller mechanism 402 as the frictional transmission unit 304, and retains the planetary rollers 412 by the pins arranged on the planetary carrier 415.

[Test Conditions and Method]

The following conditions and method were employed for the measurement test.

(1) Measurement was made at both no load and 100% load.

(2) Before measurement, each sample was run in for two minutes clockwise and two minutes counterclockwise regardless of its lubricating system.

(3) Measurement rotations both clockwise and counter-clockwise.

(4) Measurements were obtained from five microphones placed one meter off from surfaces of the geared motor, namely, the surfaces on the upper, left, and right sides of the geared motor, in front of the low-speed shaft, and on the back of the motor (the one meter excluding any projection).

(5) Microphone selector was switched to read measurements from a precision noise meter on a one-place-at-a-time basis.

(6) Measurement was made in a soundproof chamber.

(7) The samples were mounted on a lightweight base of lower rigidity (flimsy or less rigid base), assuming harsh installation conditions. Some of the samples were also mounted on an FC surface plate (cast iron foundation) for measurement. In either case, the samples were brought into intimate contact with the top surface of the base or the surface plate so as not to create a space therebetween.

(8) Prony brake as the load.

(9) Audibility A-weighted.

(10) The outputs of the noise meter were subjected to FFT analysis for noise spectrum measurement. At 32-times SUM (averaging) mode.

[Noise Measurements]

Figure 11:
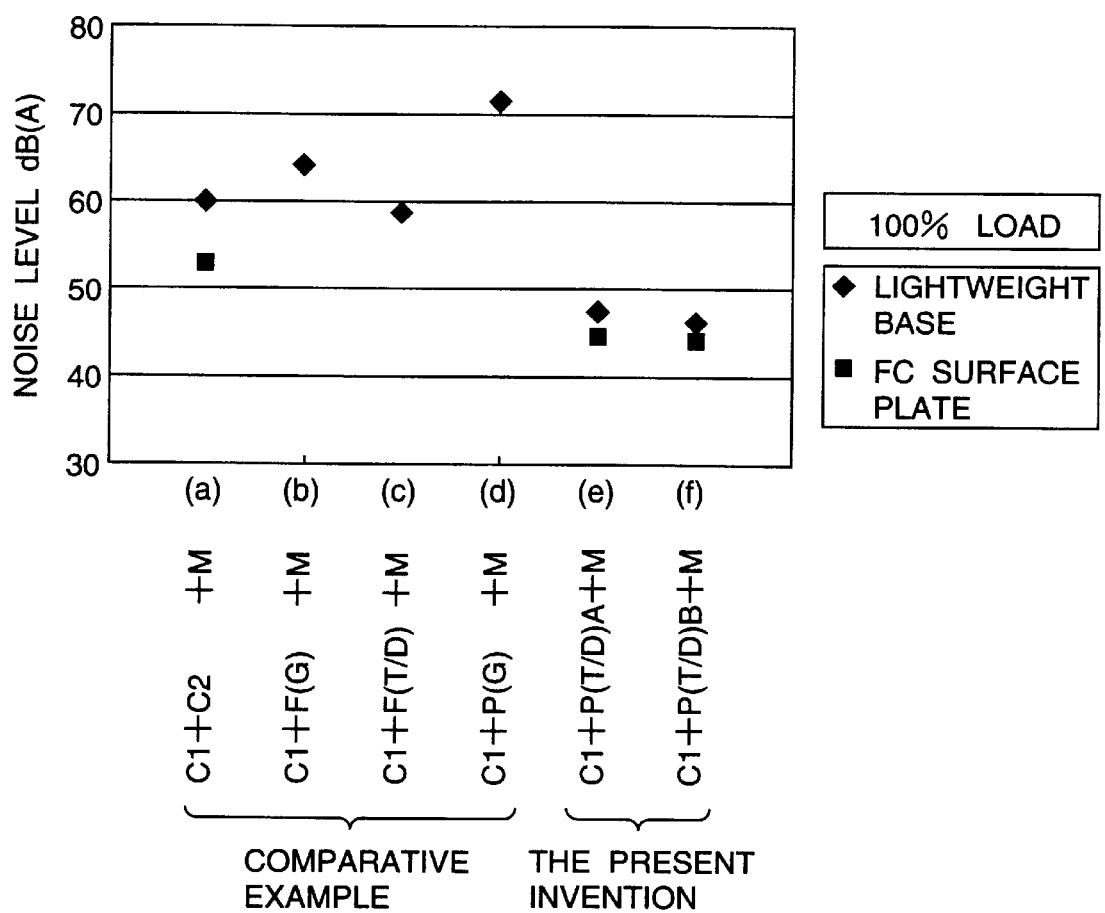
FIG. 11 is a graph showing the noise measurements.

The noise measurements are shown in the table of FIG. 10 in the form of numerals. The differences in noise level at 100% load are shown in the graph of FIG. 11. FIGS. 12 to 15 show the noise spectrum analyses.

[Considerations from Noise Measurements]

The noise measurements allow the following considerations.

(1) With reference to the geared motor (a), the gearing-systemed geared motor (b) of power-distributed type was higher in noise. The reason for this seems to be that the latter, because of being the power-distributed type, caused the mutual transmission of vibrations through its power-distributed shafts, thereby producing overall resonance.

(2) It is found from a comparison between the power-distributed types that the sample (c), having the power-distributed transmission system replaced with the friction roller type, was lower in noise than the sample (b). The reason for this seems to be that the contact surfaces of the friction rollers appropriately exerted their vibration absorbing functions. The friction roller type, however, made little difference from the type (a). This means that the simple use of friction rollers does not always offer the noise reduction effect.

(3) It is seen that the geared motor (d), employing a planetary gear mechanism at the preceding stage, was remarkably high in noise as compared to the types (a) to (c). The reason for this seems to be that the planetary gear mechanism itself included a number of gear-meshing points, and those number of meshing points produced vibrations to boost the overall noise level. This means that just interposing the simple-planetary-typed reduction unit offers no noise reduction effect, and may even cause a noise increase.

(4) In contrast, it is seen that the geared motors of types (e) and (f) having been described in the embodiments of the present invention achieved a great noise reduction as compared to the others. The chief reason for this seems to be that the simple-planetary types employed the friction rollers instead of gears. In other words, the planetary-gear-typed geared motor (d), because of being the planetary type, was inevitably greater in the number of meshing points among its gears to produce extremely higher noises. On the contrary, the geared motors of types (e) and (f) had replaced the gears with the friction rollers, and therefore a number of frictional contact surfaces were secured instead, which enhanced the noise absorbing function to achieve the overall noise reduction.

(5) Now, what is responsible for the difference between the type (c) and the types (e), (f) seems to be that: while the power-distributed roller type (c) could secure frictional contact surfaces as many as the types (e) and (f) did, the frictional contact surfaces rather functioned to pick up the vibrations of the power-distributed shafts (as described above) to hinder the high noise-reduction effect. In contrast, it appears that the types (e) and (f), because of being the simple planetary type, had no possibility of picking up unnecessary vibrations and thus could contribute to the noise reduction.

(6) When the mountings were switched from the light-weight bases to the surface plates, the type (a) underwent a significant change while the types (e) and (f) did not make a very large change in noise level. This fact allows the following reasoning. That is, the geared motor of type (a) itself has a considerable level of vibrations, and therefore when the motor is mounted on a lightweight base, the base is vibrated by the motor to produce higher noises (through resonance). In contrast, when this motor is mounted on a mating member extremely robust in terms of rigidity, such as a surface plate, those vibrations are suppressed because of the mounting, thereby reducing the noises. Meanwhile, the geared motors of types (e) and (f) themselves are controlled in vibration level by a fair amount, and thus make little difference depending on the modes of installation or the mating member for the installation.

In any case (regardless of whether the above reasoning is correct or not), it is at least apparent that the vibration reducing effect prevails throughout the geared motors (e) and (f) of the present invention to the extent that the difference in the mode of installation produces little difference in noise level. In view of the fact that a geared motor of this type needs to be mounted on some mating member in actual applications, it is a tremendous advantage to be "low in noise level regardless of the mating member."

(7) As also seen from the noise spectra, the geared motors (e) and (f) were much reduced in noise level almost all over the frequency domains as compared to the other geared motors (a) to (d). This suggests that great reductions were made both in noise, which is easy to perceive at higher frequencies, and in vibration, which is easy to perceive at lower frequencies.

Hereinafter, description will be given of the specific variations for practicing the present invention.

Each of the above-described embodiments has dealt with the case where the joint casing 153, 353 comprises a part of the casing 151, 351 of the reduction gear unit 102, 302 and a part of the casing 155, 355 of the motor unit 103, 303, so that the simple planetary roller mechanism 202, 402 serving as the frictional transmission unit 104, 304 is arranged inside the joint casing 153, 353 in order to ensure the unity as a geared motor.

However, as far as further "noise reduction" is intended, the casings of the reduction gear unit, frictional transmission unit, and motor unit may be deliberately separated from each other in order to block vibrations being transmitted across units through the casings.

In this case, some vibration absorbing means, such as rubber, can be inserted into the coupling portions among the casings to achieve further blockage of vibration transmission.

For the purpose of avoiding outward vibration transmission through the casings, it is also preferable that the direct fixing between the ring roller 213, 413 of the simple planetary roller mechanism 202, 402 and the joint casing 153, 353 be abandoned, and vibration absorbing means or a space be interposed between the two members.

By so doing, the three units, namely, the reduction gear unit, the frictional transmission unit, and the motor unit can be insulated from one another in terms of the power transmission paths as well as in view of the casings. This particularly suppresses casing vibrations, thereby improving the effect of avoiding the resonance with mating members as well as among the units. In this connection, when the three casings are separated from one another, the geared motor's legs for use in external installation are preferably arranged on the casing of the frictional transmission unit that employs the simple planetary roller mechanism to allow the vibration absorbing function. By this means, the geared motor installed can make an additional suppression of the vibration transmission to the mating member, thereby allowing a further reduction in noise level.

The embodiments described above have dealt with the cases where the sun rollers 211, 411 of the simple planetary roller mechanisms 202, 402 make the input elements, the planetary carriers 215, 415 supporting the planetary rollers 212, 412 the output elements, and the ring rollers 213, 413 the fixed elements. However, the input, output, and fixed elements create the six combinations as shown in FIG. 16, and any of these may be selected if needed. These input-output-fixed combinations can be combined with variations of roller diameters to develop a series of driving apparatuses with a great variety of reduction ratios and functions.

That is, due to its structure, an oscillating internal meshing planetary gear unit is composed of special parts. Keeping many varieties of parts in stock all the time leads to higher inventory costs, which is one of the big problems to the fabricator side. Meanwhile, a frictional transmission unit can be easily modified in speed change ratio by changing the diameter of each friction roller. In addition, a frictional transmission unit can secure an extremely wide range of speed change ratio variations, including step-ups, by switching the input-output-fixed combination. Moreover, since each of its friction rollers is capable of stepless changes in diameter, a frictional transmission unit is also widely applicable to yet finer adjustments in speed change ratio. Accordingly, this frictional transmission unit can carry a variety of functions to secure variety of the entire driving apparatus (even when using the same oscillating internal meshing planetary gear unit and/or the same motor). Therefore, a frictional transmission unit is highly advantageous in developing a series of driving apparatuses.

Now, though including some repetitions, description will be made in detail of the above-mentioned contrivances as to the arrangement and assembly of the first reduction mechanism unit (the frictionally-engaging unit) 104. These contrivances are particularly effective at practicing the present invention while minimizing the changes to the conventional driving apparatuses.

Returning to FIG. 1, the support carrier 123 closer to the drive unit 103 is of annular shape having the center hole 123a. Inside this center hole 123a lies the extremity 111a of the first shaft 111. The other support carrier 124 is integrally formed on the base of the second shaft 112, and has the recess 124a into which the other end 111b of the first shaft 111 is inserted. The first shaft 111 is rotatably supported by the bearing 133 fitted into the through hole 123a in the carrier 123, and the bearing 134 fitted to the vicinity of the recess 124a in the other support carrier 124.

As shown in FIGS. 2 and 3, the first reduction mechanism unit 104 is of simple planetary roller structure, including the sun roller 211, the planetary rollers 212, the ring roller 213, and the planetary carrier 215. The sun roller 211 is to be coupled to the drive shaft (motor shaft) 161 of the drive unit 103. The planetary rollers 212 make rolling contact with the outer periphery of the sun roller 211. The planetary rollers 212 also make internal contact with the ring roller 213. The planetary carrier 215 extracts the revolution components of the planetary rollers 212 and transmits the same to the first shaft 111 of the second reduction mechanism unit (the oscillating internal meshing planetary gear unit) 102.

The outside diameter of the ring roller 213 in this first reduction mechanism 104 is set within the outside diameter of the bearing 131 that supports the one closer to the drive unit 103, of the pair of support carriers 123 and 124 in the second reduction mechanism unit 102 (namely, the support carrier 123). Besides, the ring roller 213 is situated within the casing 151 (more specifically, within the joint casing 153), in the space on the drive-unit-103 side of the bearing 131.

The inside diameter D3 of the ring roller 213 is set to be somewhat smaller than the sum of the value twice the diameter D2 of the above-mentioned planetary rollers 212 and the diameter D1 of the sun roller 211. Therefore, when the ring roller 213 has the planetary rollers 212 and the sun roller 211 arranged inside, the ring roller 213 undergoes a subtle elastic deformation toward the radial outside. It is the stresses accompanying this deformation that apply a given pressing force to the contact surfaces among the respective fiction rollers 211, 212, and 213 to generate frictional forces.

The ring roller 213 is fixed to the joint casing 153 by the through bolts 252, making the fixed element of the simple planetary roller structure. Here, the sun roller 211 makes the input element, and the planetary carrier 215 supporting the planetary rollers 212 makes the output element. To prevent radial external pressures from acing on the ring roller 213, the outside diameter of the ring roller 213 is set to be smaller than the bore diameter of the joint casing 153.

The planetary carrier 215 for extracting the revolutions of the planetary rollers 212 has the output shaft portion 216 of hollow cylindrical shape, projected toward the reduction gear unit 102, and the retainer portion (the retainer) 217 integrally formed on the base side of the output shaft portion 216. The inner spline 218 is formed on the inner periphery of the output shaft portion 216. This inner spline 218 engages with the outer spline formed on the shaft end portion of the first shaft 111 of the second reduction mechanism unit 102 (see FIG. 1), making integral rotations with the same.

The retainer portion 217 has four axially-extending projections 217a to 217d to be inserted to between the four planetary rollers 212. Each of the projections 217a to 217d is provided with concave arcuate surfaces 219 having the same curvature as that of the outer peripheries of the planetary rollers 212.

Thus, the retainer portion 217 puts the above-mentioned concave arcuate surfaces 219 into contact with the planetary rollers 212 to retain the respective planetary rollers 212 in regular mutual positions along the circumferential direction at 90° intervals. As a result, the planetary carrier 215 equipped with this retainer portion 217 functions to rotatably retain the planetary rollers 212 and to extract the revolution components of the planetary rollers 212.

On both end faces of the ring roller 213 are arranged the side plates 221 of annular shape. By these side plates, the contact surface of the ring roller 213 with the planetary rollers 212 is shielded from outside all over the circumference. This shielded space is also sealed from inside by the outer peripheries of the retailer portion 217 so that traction grease priced higher than gear grease is enclosed in the shielded space. The role of the traction grease is to ensure frictional forces, not to reduce friction.

The partition plate 222 is also arranged at the end of the sun roller 211 to separate the space accommodating the sun roller 211 from the internal space of the output shaft portion 216.

Note that the simple planetary roller structure for the first reduction mechanism unit according to the present invention is not limited to the retainer type as described above. The structure may also be of pin type in which the planetary carrier 215 has axially-extending pins so that the planetary rollers 212 of annular shape are rotatably retained by the pins.

In this first reduction mechanism unit 104, the drive unit 103 drives the sun roller 211, which urges the planetary rollers 212 to revolve around the sun roller 211. Since they are sandwiched between the ring roller 213 and the sun roller 212, the planetary rollers 212 roll over the inner periphery of the ring roller 213 while revolving around the sun roller 211. In other words, the planetary rollers 212 entail their own rotations while revolving around the sun roller 211. The revolutions of the planetary rollers 212 are extracted by the planetary carrier 215 via the retainer portion 217 and transmitted to the first shaft of the second reduction mechanism unit 102 at a given reduction ratio. Incidentally, the planetary carrier 215 and the first shaft of the second reduction mechanism unit 102 may be integrated with each other.

Then, as described previously, the rotations are transmitted through the second reduction mechanism unit 102 of oscillating internal meshing planetary gear structure at a given reduction ratio, and output from the second shaft 112.

Here, the present inventors have focused on the fact that the ring roller 213 in the simple planetary roller structure has the same ring configuration as that of the bearing 131, and found that a little change to the internal design of the casing 151 makes the first reduction mechanism unit 104 installable to rational positions near the bearing 131. Under this idea, the outside diameter of the ring roller 213 is set to be within that of the bearing 131 for supporting the support carrier 123 in the second reduction mechanism unit 102. This allows the ring roller 213 to be concentrically accommodated at the side closer to the drive unit 103, of the ring roller 213.

As a result, the first-stage reduction mechanism unit achieves higher reduction ratios (higher outputs) considering its simple planetary structure, whereas the driving apparatus 101 in this embodiment is controlled within mere 5% or so in axial extension as compared to a driving apparatus consisting of the drive unit 103 and the second reduction mechanism unit 101 only. Therefore, the contradictory demands for higher reduction ratios and more compact configurations can be rationally satisfied at the same time, which has been regarded as difficult. This also reduces the manufacturing costs greatly as compared to the conventional ones.

Moreover, the first reduction mechanism unit 104 employs the simple planetary roller structure of frictional transmission type in which the rotational power is transmitted by means of the frictional forces produced among the friction rollers 211, 212, and 213. Therefore, the first reduction mechanism unit 104 is quieter as compared to that constituted by using a gear structure. Accordingly, despite of its two-stage reduction structure having the first and second reduction mechanism unit 104 and 102 in combination, the driving apparatus 101 will not produce a problem of increasing noises, but rather contribute a noise reduction by far beyond expectations, as described previously. In particular, this driving unit accommodates both the first and second reduction mechanism units 104 and 102 in the same internal space inside its casing 151. This precludes individual resonance in the two spaces from interfering with each other for generation of new resonance, thereby avoiding a further increase in noise.

Now, with reference to FIGS. 17(A) to 17(C), description will be given of the method for assembling (manufacturing) the driving apparatus 101.

Figure 17A:
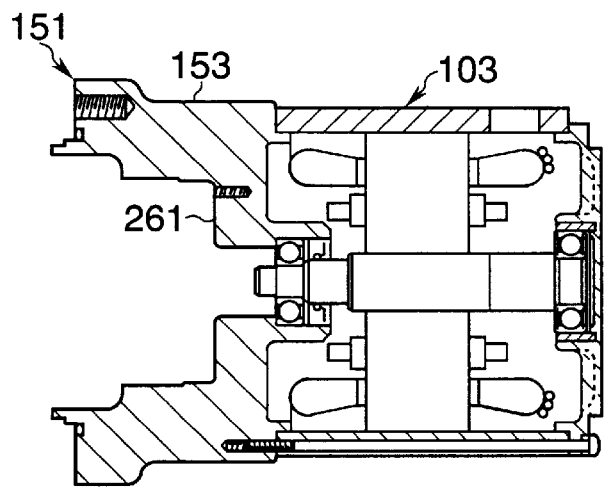
FIGS. 17(A) to 17(C) are schematic diagrams showing the assembling processes of the driving apparatus.

As shown in FIG. 17(A), the casing 151 (more specifically, the joint casing 153 constituting the same) is initially attached to the drive unit 103. In other words, the drive unit 103 as assembled and modularized in a previous step is coupled to the casing 151.

Figure 17B:
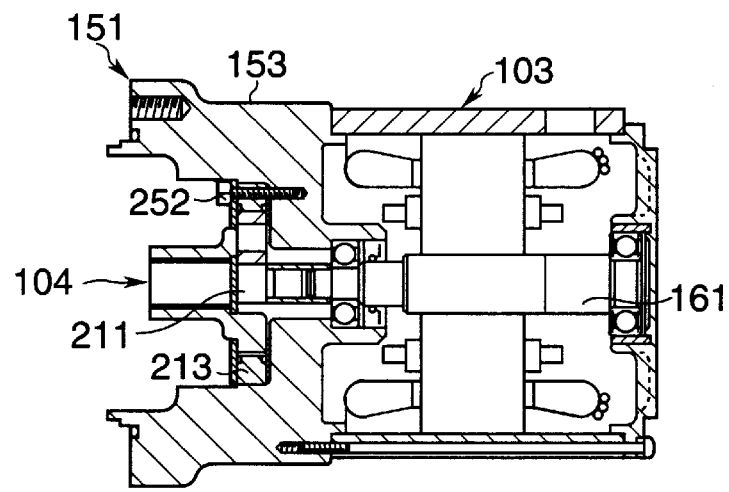

Then, as shown in FIG. 17(B), the first reduction mechanism unit 104 of simple planetary roller structure is mounted, from the side opposite from (the side opposite to) the drive unit 103, onto the casing 151 (the joint casing 153) having the drive unit 103 attached thereto. This first reduction mechanism unit 104 has been assembled in a previous step by shrink-fitting the sun roller 211, the planetary rollers 212, and the ring roller 213, and then inserting the retainer portion 217 of the planetary carrier 215 to the same. Therefore, the entire unit has only to be inserted into the casing 151 before the ring roller 213 is fixed thereto by the through bolts 252.

Here, this first reduction mechanism unit 104 can be readily inserted because the sun roller 211 and the drive shaft 161 are in a floating coupling structure (spline structure) with each other, creating radial play therebetween.

Figure 17C:
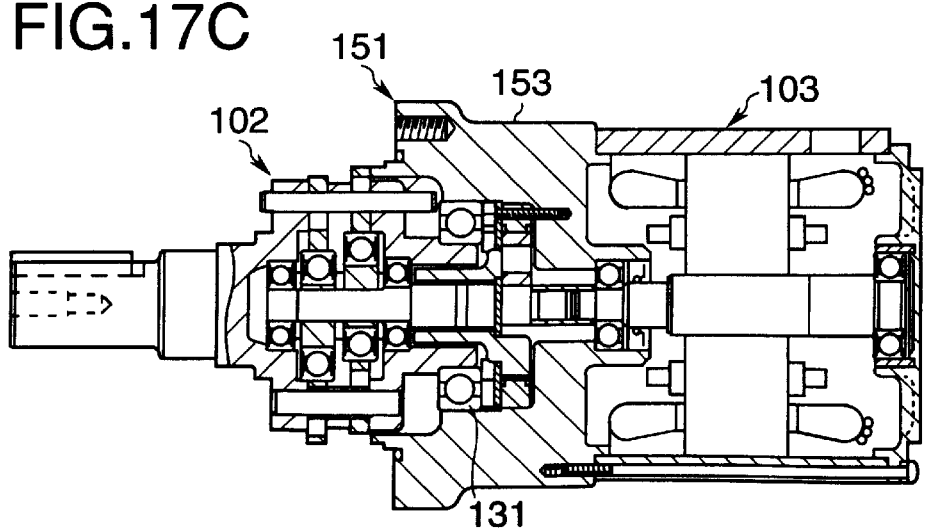

Subsequently, as shown in FIG. 17(C), the second reduction mechanism unit 102 of oscillating internal meshing planetary gear structure is mounted onto the casing 151 having the first reduction mechanism unit 104 built-in. Again, this second reduction mechanism unit 102 (excluding the internal gear 120) can be assembled up to nearly one unit (one module) in a previous step, and therefore has only to be inserted into the casing 151. Incidentally, the internal gear 120 (and the central casing 152 containing the same) is preferably fixed to the joint casing 153 in advance.

Then, the front casing 154 is mounted to complete the driving apparatus 101.

According to this method, the high-modularitied units, namely, the drive unit 103, the first reduction mechanism unit 104, and the second reduction mechanism unit 102, can be combined quickly on the basis of the casing 151 (the joint casing 153). This advantage is attributed to the fact that the outside diameter of the first reduction mechanism unit 104 (the outside diameter of the ring roller 213) is set to be smaller than the outside diameter of the bearing 131 in the second reduction mechanism unit 102 so that these units are accommodated in the same internal space.

Moreover, the first and second reduction mechanism units 104 and 102 both of coaxial power transmission configuration can be mounted with reference to the axis center of the drive shaft 161 of the drive unit 103 mounted first. This facilitates the center positioning, and thereby improves the assembling precision and the assembling speed greatly.

As a result, the worker's trouble for the assembly is largely eased, and the manufacturing costs are also reduced.

The foregoing embodiments have dealt with the cases where the second reduction mechanism unit in this driving apparatus is of oscillating internal meshing planetary gear structure. However, as seen from its concept, the present invention is not limited to the above-mentioned structure. That is, the present invention is similarly applicable with any other second reduction mechanism unit as long as the unit is of support carrier transmission type structure, comprising a speed reducer to be coupled to the first reduction mechanism unit, and a pair of support carriers rotatably supported by the casing via bearings to extract the rotating power of the reduction device.

Finally, with reference to the embodiment shown in FIGS. 18 to 20, description will be made in detail of the structure for mounting the frictional transmission unit 104 by using the "mounting reference surface" (and in detail of the floating connection structure). Incidentally, this embodiment basically includes a number of components common to those of the embodiment shown in FIGS. 1 to 4. Accordingly, like components will be designated by reference numerals having the same lower two digits, and repetitive descriptions thereto will be omitted.

This single planetary roller mechanism 202 is mounted onto a deeply-bored recess portion 251 formed in the inner periphery of a joint casing 153 at the side closer to a reduction gear unit 102. Here, the inside diameter of this recess portion 251 is set to be smaller than that of an accommodating portion 253 for accommodating a bearing 131, so that the difference in inside diameter forms a shoulder 260 on the joint casing 153. An end face of the bearing 131 is put into contact with the shoulder 260 to set the center axis L of the bearing 131 in position.

Figure 19:
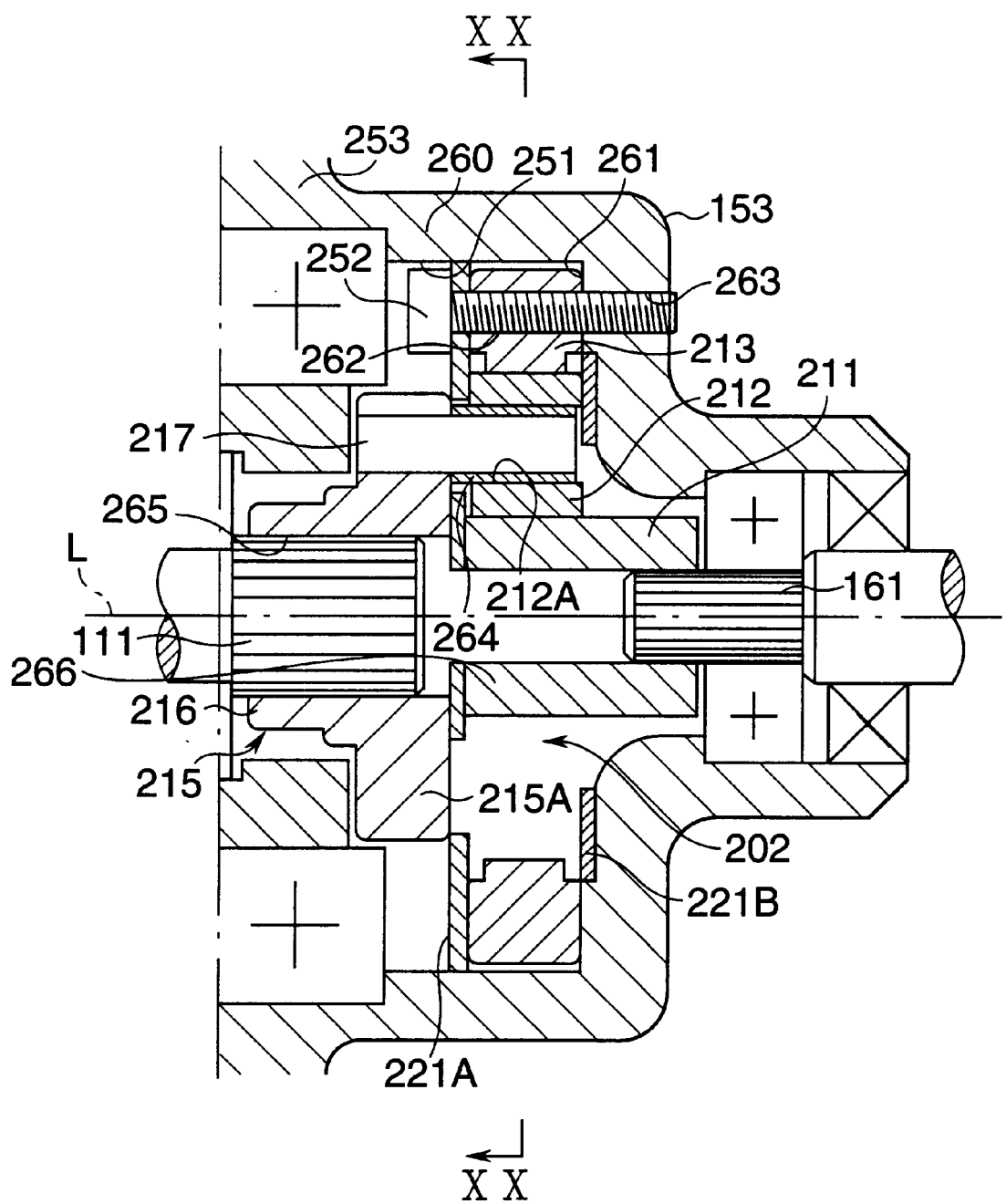
FIG. 19 is a sectional view of the frictional transmission unit (the simple planetary roller mechanism) in the geared motor.
Figure 20:
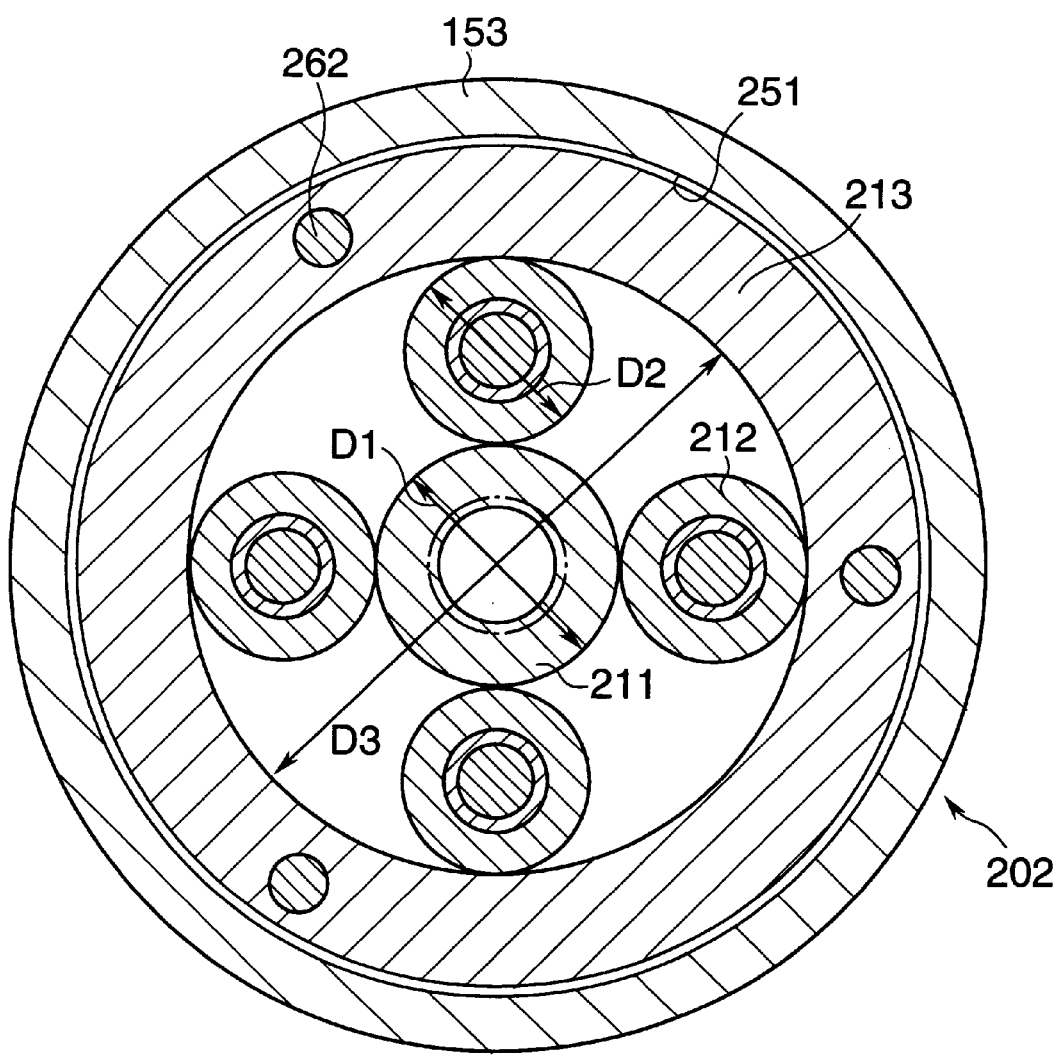
FIG. 20 is a view taken along the arrowed line XX—XX of FIG. 19.
Figure 21:
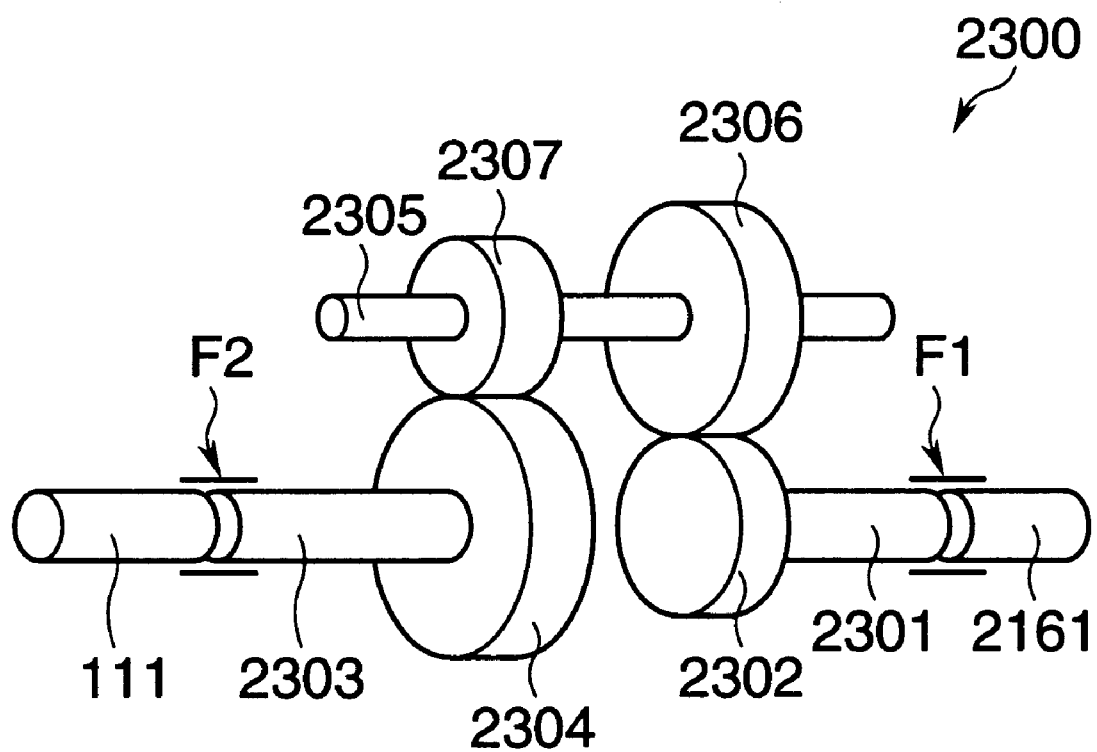
FIG. 21 is a schematic perspective view showing another example of the frictional transmission unit.

As shown in FIGS. 19 and 20, the simple planetary roller mechanism 202 has friction rollers consisting of a sun roller 211, a plurality (four, in this embodiment) of planetary rollers 212, and a ring roller 213. The sun roller 211 has a spline shaft portion 214. The planetary rollers 212 are of hollow cylindrical shape, and make rolling contact with the outer periphery of the sun roller 211. The ring roller 213 has an inside diameter D3 somewhat smaller than the sum of the diameter D1 of the sun roller 211 and the value twice the diameter D2 of the above-mentioned planetary rollers 212. The ring roller 213 has the planetary rollers 212 arranged inside so as to make internal contact.

Again, the ring roller 213 makes the fixed element of the simple planetary roller mechanism 202. The sun roller 211 makes the input element, and a planetary carrier 215 supporting the planetary rollers 212 the output element.

On the bottom of the recess portion 251 in the joint casing 153 is formed a mounting reference surface 261 which is perpendicular to the direction of the rotation/revolution axes of the sun roller 211, the planetary rollers 212, and the ring roller 213 (the direction of the center axis L). The ring roller 213 is pressed against this mounting reference surface 261 to be fixed to the joint casing 153. As for the means for pressing the ring roller 213 against the mounting reference surface 261 in the present embodiment, the ring roller 213 is provided with bolt holes 262 piercing therethrough in the direction of the rotational axis (the direction of the center axis L. The ring roller 213 is fixed to the mounting reference surface 261 by fixing bolts 252 inserted through the bolt holes 262 and threadedly engaged with tapped holes 263 formed in the mounting reference surface 261.

Incidentally, the present invention may also use any pressing means other than the above-described pressing means.

The inside diameter of the recess portion 251 is set to be somewhat greater than the outside diameter of the ring roller 213. Besides, the inside diameter of the bolt holes 262 is set to be greater that the outside diameter of the fixing bolts 252. Accordingly, the ring roller 213 and the fixing bolts 252 are fitted to the recess portion 251 and the bolt holes 262 with play, respectively. The ring roller 213 can be shifted within the range of the play before the fixing bolts 252 are tightened completely. This makes the ring roller 213 (the simple planetary roller mechanism 202) adjustable in axis position within the mounting reference surface 261.

As shown in FIG. 19, the planetary carrier 215 for extracting the revolutions of the planetary rollers 212 has an annular flange portion 215A, an output shaft portion 216 of hollow cylindrical shape, and four pins 217. The output shaft portion 216 is projected from the flange portion 215A toward the reduction gear unit 102. The pins 217 are fitted and fixed to the flange portion 415a at their bases, and projected toward a motor unit 103 at their extremities. Cylindrical inner rollers 264 are arranged on the pins 217 so as to be capable of sliding rotations.

Each of the planetary rollers 212 has a center hole 212A formed in its axis position. By means of the center holes 212A and through the intervention of the inner rollers 264, the planetary rollers 212 are rotatably fitted on the outer peripheries of the respective pins 217, whereby the planetary rollers 212 are retained at constant mutual positions. In this state, the outer periphery of each of the planetary rollers 212 is in contact with the inner peripheral surface of the ring roller 213 and with the outer peripheral surface of the sun roller 211. Thus, the planetary carrier 215 provided with the pins 217 functions to maintain the spacing among the planetary rollers and 212 to extract the revolution components of the planetary rollers 212.

The inner rollers 264 make rotations while sliding at the contact surfaces with the outer peripheral surfaces of the pins 217 and with the center holes 212A, so as to absorb the difference in rotational speed between the pins 217 and the planetary rollers 212. That is, the cylindrical inner rollers 264 make rotations faster than the rotational (revolving) speed of the pins 217 and slower than the rotating speed of the planetary rollers 212. This allow the respective contact surfaces to slide at a speed smaller than the actual difference in speed between the pins 217 and the planetary rollers 212. As a result, it becomes possible to reduce the frictional heat generation, the frictional resistance, and the like.

On both sides of the planetary rollers 212 are arranged annular spacers 221A and 221B.

The output shaft portion 216 of the planetary carrier 215 also has a carrier-side shaft insertion hole 265 formed in its axis position. A first shaft 111 can be inserted to the carrier-side shaft insertion hole 265 so that the planetary carrier 215 engages with the first shaft 111 in the rotational direction to make integral rotations. Specifically, this carrier-side shaft insertion hole 265 has an inner spline structure to establish floating connection with the first shaft 111 in the rotational direction while allowing a constant radial clearance (play).

Meanwhile, the sun roller 211 has a sun-roller-side shaft insertion hole 266 formed in its axis position. A motor shaft 161 of the motor unit 103 can be inserted to the sun-roller-side shaft insertion hole 266 so that the sun roller 211 engages with the motor shaft 161 in the rotational direction to make integral rotations. Specifically, this sun-roller-side shaft insertion hole 266 has an inner spline structure to establish floating connection with the motor shaft 161 in the rotational direction while allowing a constant radial clearance (play).

The entire frictional transmission unit 104, having the sun-roller-side shaft insertion hole 266 formed in the sun roller 211 and the carrier-side shaft insertion hole 265 formed in the planetary carrier 215, therefore forms a so-called shaft coupling structure.

This simple planetary roller mechanism 202 is assembled, for example, in the following manner. Initially, the planetary rollers 212 are mounted on the outer peripheries of the pins 217 of the planetary carrier 215 via the cylindrical inner rollers 264. Then, the planetary rollers 212 as-mounted are put into external contact with the outer periphery of the sun roller 211. In that state, the ring roller 213 is heated to expand, and the planetary rollers 212 retained by the planetary carrier 215 are inserted into the bore of the ring roller 213. This subsequently cools to complete the simple planetary roller mechanism 202 in which the ring roller 213 and the planetary rollers 212, as well as the planetary rollers 212 and the sun roller 211, are in contact with each other at a given contact pressure.

In its mounting onto a casing, the simple planetary roller mechanism 202 is mounted onto the mounting reference surface 261 as mentioned previously. This mounting is carried out with the motor unit 103 previously installed on the casing 153. Therefore, the simple planetary roller mechanism 202 is brought into the recess portion 251 so that the motor shaft 161 is inserted into the sun-roller-side shaft insertion hole 266. This simple planetary roller mechanism 202 is shifted within the mounting reference surface 261 in order that the axes of the sun-roller-side shaft insertion hole 266 and the motor shaft 161 coincide with each other. After the adjustment is completed with a constant circumferential clearance (play) between the sun-roller-side shaft insertion hole 266 and the motor shaft 161, the ring roller 213 is fixed by the fixing bolts 252. Then, the reduction gear unit 102 is mounted so that the output shaft portion 216 of the planetary carrier 215 of the simple planetary roller mechanism 202 lies inside a center hole 123a in the support carrier 123 of the reduction gear unit 102. This completes a geared motor 101.

The ring roller 213 of this simple planetary roller mechanism 202 is fixed to the joint casing 153. Accordingly, unlike ordinary couplings as shown in FIGS. 22 and 23, which are simply fitted onto shafts to keep their own positions (by being supported by the shafts in return), the ring roller 213 can maintain a given amount of clearance between each power transmission shaft (the motor shaft 161, the first shaft 111) and the corresponding shaft insertion hole 265, 266 all the time. This ensures the blockage and absorption of vibrations and noises. Moreover, since the simple planetary roller mechanism 202 is adjustable in axis position, those clearances can be precisely set in the first place. This is combined with the ensured blockage and absorption to achieve further suppression of noises and vibrations.

Furthermore, in this geared motor 101, the ring roller 213 is fixed to the joint casing 153 without undergoing radial pressures, i.e., as pressed against the mounting reference surface 261 which is perpendicular to the center axis L. Accordingly, as compared to the cases where the ring roller 213 is fixed by press-fit or other method, the contact pressures among the friction rollers are prevented from fluctuation. Therefore, smooth rotations/revolutions of the planetary rollers 212 and the sun roller 211 are realized. In addition, the ring roller 213 allows its own vibrations to some extent to realize energy absorption there. At the same time, the mounting reference surface, which is formed along the direction of thickness of the joint casing 153 and therefore high in radial rigidity, can surely receive the vibrations to prevent the vibrations from being transmitted to the entire casing.

The above-described method of fixing the ring roller 213 is highly advantageous in view of noise suppression as previously described. In addition to achieving the simple noise reduction, the method also eliminates the need for the press-fitting of the ring roller 213 as also described in the foregoing embodiments, and thereby facilitates the assembling processes.

The simple planetary roller mechanism 202 provides each of the planetary carrier 215 and the sun roller 211 with a shaft insertion hole to establish a "shaft coupling structure." Therefore, this simple planetary roller mechanism 202 can be replaced with an ordinary coupling that has so far coupled the motor shaft 171 and the first shaft 111 directly, to realize this geared motor 101 easily (though needed a small change to the casings). The simple planetary roller mechanism 202 can also be realized into an axially compact configuration, causing no large increase in the axial size of the entire geared motor 101.

While the present embodiment has dealt with the case where the ring roller 213 is directly fixed to the mounting reference surface 261, the present invention is not limited thereto. The essential function of this mounting reference surface is to determine the position to fix the ring roller. Therefore, the present invention also covers such configurations that the ring roller is pressed against the mounting reference surface for positioning and then fixed by another part of the casing. Put another way, the present invention generally covers such configurations that the ring roller is positioned not only at its outer-periphery side (by press-fit or other means) but at its end-face side as well, and mounted so that external forces radially acting on the ring roller are not directly transmitted in the direction of thickness of the casing.

While there has been described what are at present considered to be preferred embodiments of the invention, it will be understood that various modifications may be made thereto, and it is intended that the appended claims cover all such modifications as fall within the true spirit and scope of the invention.

Moreover, the individual configurations set forth in the respective appended claims may be freely combined without departing from the spirit thereof, so that the combination offers a synergistic function.

What is claimed is:

1. A driving apparatus comprising:
   an oscillating internal meshing planetary gear unit having an internal gear and an external gear making internal contact with said internal gear, the center of said internal gear lying inside the periphery of said external gear, and
   an external unit to be connected with said oscillating internal meshing planetary gear unit so as to be capable of inputting or extracting power thereto or therefrom, wherein:
   between said oscillating internal meshing planetary gear unit and said external unit is interposed a frictional transmission unit which has a plurality of friction rollers contacting each other, for transmitting rotational power between said oscillating internal meshing planetary gear unit and said external unit by means of friction among said plurality of friction rollers;
   said frictional transmission unit is constituted by a simple planetary roller mechanism including said friction rollers including a sun roller, a plurality of planetary rollers being retained by a planetary carrier and making rolling contact with the outer periphery of said sun roller, and a ring roller with which said plurality of planetary rollers make internal contact, said simple planetary roller mechanism being constructed so that one of said sun roller, said planetary carrier and said ring roller is used as a fixed element, either of the other two is used as an input element, and a remaining one is used as an output element;
   of the coupling portions between said frictional transmission unit and said oscillating internal meshing planetary gear unit and between said frictional transmission unit and said external unit, at least one coupling portion has a floating connection structure; and
   of the coupling portions between said planetary carrier in said frictional transmission unit of simple planetary roller mechanism and said oscillating internal meshing planetary gear unit and between said sun roller and said external unit, at least the coupling portion between said planetary carrier and said oscillating internal meshing planetary gear unit has said floating connection structure.

2. A driving apparatus comprising:
   an oscillating internal meshing planetary gear unit having an internal gear and an external gear making internal contact with said internal gear, the center of said internal gear lying inside the periphery of said external gear, and an external unit to be connected with said oscillating internal meshing planetary gear unit so as to be capable of inputting or extracting power thereto or therefrom, wherein:

between said oscillating internal meshing planetary gear unit and said external unit is interposed a frictional transmission unit which has a plurality of friction rollers contacting each other, for transmitting rotational power between said oscillating internal meshing planetary gear unit and said external unit by means of friction among said plurality of friction rollers;

said frictional transmission unit is constituted by a simple planetary roller mechanism including said friction rollers including a sun roller, a plurality of planetary rollers being retained by a planetary carrier and making rolling contact with the outer periphery of said sun roller, and a ring roller with which said plurality of planetary rollers make internal contact, said simple planetary roller mechanism being constructed so that one of said sun roller, said planetary carrier and said ring roller is used as a fixed element, either of the other two is used as an input element, and a remaining one is used as an output element;

a casing for accommodating said frictional transmission unit is provided with a mounting reference surface perpendicular to the direction of the rotation axes of said sun roller, planetary rollers, and ring roller;

the driving apparatus further comprises fixing means for fixing said ring roller to said casing while pressing said ring roller against the mounting reference surface; and said ring roller is adjustable in axis position within the mounting reference surface.

3. A driving apparatus according comprising:

an oscillating internal meshing planetary gear unit having an internal gear and an external gear making internal contact with said internal gear, the center of said internal gear lying inside the periphery of said external gear, and an external unit to be connected with said oscillating internal meshing planetary gear unit so as to be capable of inputting or extracting power thereto or therefrom, wherein:

between said oscillating internal meshing planetary gear unit and said external unit is interposed a frictional transmission unit which has a plurality of friction rollers contacting each other, for transmitting rotational power between said oscillating internal meshing planetary gear unit and said external unit by means of friction among said plurality of friction rollers;

said frictional transmission unit is constituted by a simple planetary roller mechanism including said friction rollers including a sun roller, a plurality of planetary rollers being retained by a planetary carrier and making rolling contact with the outer periphery of said sun roller, and a ring roller with which said plurality of planetary rollers make internal contact, said simple planetary roller mechanism being constructed so that one of said sun roller, said planetary carrier and said ring roller is used as a fixed element, either of the other two is used as an input element, and a remaining one is used as an output element;

a casing for accommodating said frictional transmission unit is provided with a mounting reference surface perpendicular to the direction of the rotation axes of said sun roller, planetary rollers, and ring roller;

the driving apparatus further comprises fixing means for fixing said ring roller to said casing while pressing said ring roller against the mounting reference surface; and said sun roller is provided with a sun-roller-side shaft insertion hole into which a power transmission shaft of said external unit is insertable, and said planetary carrier is provided with a carrier-side shaft insertion hole into which a power transmission shaft of said oscillating internal meshing planetary gear unit is insertable, so as to form said frictional transmission unit into a shaft coupling structure for allowing relative rotations of said power transmission shafts.

4. The driving apparatus according to claim 3, wherein at least either said sun-roller-side shaft insertion hole or said carrier-side shaft insertion hole has a floating connection structure with respect to said power transmission shaft inserted therethrough.

5. A driving apparatus comprising:

an oscillating internal meshing planetary gear unit having an internal gear and an external gear making internal contact with said internal gear, the center of said internal gear lying inside the periphery of said external gear, and an external unit to be connected with said oscillating internal meshing planetary gear unit so as to be capable of inputting or extracting power thereto or therefrom, wherein:

between said oscillating internal meshing planetary gear unit and said external unit is interposed a frictional transmission unit which has a plurality of friction rollers contacting each other, for transmitting rotational power between said oscillating internal meshing planetary gear unit and said external unit by means of friction among said plurality of friction rollers;

said frictional transmission unit is constituted by a simple planetary roller mechanism including said friction rollers including a sun roller, a plurality of planetary rollers being retained by a planetary carrier and making rolling contact with the outer periphery of said sun roller, and a ring roller with which said plurality of planetary rollers make internal contact, said simple planetary roller mechanism being constructed so that one of said sun roller, said planetary carrier and said ring roller is used as a fixed element, either of the other two is used as an input element, and a remaining one is used as an output element;

a casing for accommodating said frictional transmission unit is provided with a mounting reference surface perpendicular to the direction of the rotation axes of said sun roller, planetary rollers, and ring roller;

the driving apparatus further comprises fixing means for fixing said ring roller to said casing while pressing said ring roller against the mounting reference surface;

said ring roller is provided with a bolt hole piercing therethrough in the direction of the rotation axis so that said ring roller is fixable to the mounting reference surface by a fixing bolt inserted through said bolt hole and threadedly engaged with a tapped hole formed in the mounting reference surface; and said bolt hole has a diameter somewhat greater than that of said fixing bolt so that said ring roller is adjustable in axis position within the mounting reference surface as long as said fixing bolt is fitted to said bolt hole with play.

6. A driving apparatus comprising a drive unit for generating rotational power, a first reduction mechanism unit coupled to an output shaft of said drive unit to transmit the rotational power, and a second reduction mechanism unit of support carrier transmission type, including reduction gears to be coupled to said first reduction mechanism unit, and a pair of support carriers rotatably supported by a casing at both axial outsides of said reduction gears via bearings, said support carriers for extracting rotational power of said reduction gears, wherein:

said first reduction mechanism unit has a simple planetary roller structure of friction transmission type, including a sun roller to be coupled to said output shaft of said drive unit, a planetary roller making rolling contact with the outer periphery of said sun roller, a ring roller with which said planetary roller makes internal contact, and a planetary carrier for extracting the revolution component of said planetary roller and transmitting the same to an input shaft of said second reduction mechanism unit, the outside diameter of said ring roller being set within the outside diameter of said bearing supporting the drive-unit-side support carrier of said pair of support carriers in said second reduction mechanism unit; and said ring roller is situated within said casing, in a space on the drive-unit side of said bearing.

7. The driving apparatus according to claim 6, wherein said second reduction mechanism unit is constituted as an internal meshing planetary gear mechanism comprising: said input shaft to be connected to said first reduction mechanism unit; an external gear for making eccentric rotations with respect to said input shaft and an internal gear fixed to said casing, said external gear internal meshing with said internal gear, said external gear and said internal gear being components of said reduction gears; said pair of support carriers rotatably supported by said casing at both axial outside positions of said reduction gears via said bearings, said support carriers for extracting the rotational component of said external gear; and an output shaft arranged coaxially with said input shaft, the rotations of said support carriers being transmitted to said output shaft.

8. The driving apparatus according to claim 6, wherein:

said casing for accommodating said first reduction mechanism unit is provided with a mounting reference surface perpendicular to the direction of the rotation axes of said sun roller, planetary roller, and ring roller; and the driving apparatus further comprises fixing means for fixing said ring roller in said space within said casing while pressing said ring roller against the mounting reference surface.

9. The driving apparatus according to claim 6, wherein said ring roller is adjustable in axis position within the mounting reference surface.

10. The driving apparatus according to claim 6, wherein said sun roller is provided with a sun-roller-side shaft insertion hole into which said output shaft of said drive unit is insertable, and said planetary carrier is provided with a carrier-side shaft insertion hole into which said input shaft of said second reduction mechanism unit is insertable, so as to form said first reduction mechanism unit into a shaft coupling structure for allowing relative rotations of said input and output shafts.

11. The driving apparatus according to claim 10, wherein at least either said sun-roller-side shaft insertion hole or said carrier-side shaft insertion hole has a floating connection structure with respect to said input/output shaft inserted therethrough.

12. The driving apparatus according to claim 6, wherein said ring roller is provided with a bolt hole piercing therethrough axially so that said ring roller is fixable to a mounting reference surface by a fixing bolt inserted through said bolt hole and threadedly engaged with a tapped hole formed in the mounting reference surface; and said bolt hole has a diameter somewhat greater than that of said fixing bolt so that said ring roller is adjustable in axis position within the mounting reference surface as long as said fixing bolt is fitted to said bolt hole with play.

* * * * *